United States Patent
Yi et al.

(10) Patent No.: US 12,555,439 B2
(45) Date of Patent: *Feb. 17, 2026

(54) VIRTUAL CHIP PURCHASE VOUCHERS

(71) Applicant: IGT, Las Vegas, NV (US)

(72) Inventors: Fei Yi, Beijing (CN); Wei Gong, Beijing (CN); Eduardo Meza, Henderson, NV (US)

(73) Assignee: IGT, Las Vegas, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,619

(22) Filed: Nov. 4, 2024

(65) Prior Publication Data

US 2025/0061776 A1    Feb. 20, 2025

Related U.S. Application Data

(63) Continuation of application No. 17/178,938, filed on Feb. 18, 2021, now Pat. No. 12,170,000.

(51) Int. Cl.
| | |
|---|---|
| *G06Q 40/00* | (2023.01) |
| *G06Q 20/04* | (2012.01) |
| *G06Q 20/06* | (2012.01) |
| *G06Q 20/32* | (2012.01) |
| *G06Q 20/36* | (2012.01) |
| *G06Q 20/40* | (2012.01) |
| *G07F 17/32* | (2006.01) |

(52) U.S. Cl.
CPC ..... *G07F 17/3251* (2013.01); *G06Q 20/0457* (2013.01); *G06Q 20/0655* (2013.01); *G06Q 20/3223* (2013.01); *G06Q 20/3672* (2013.01); *G06Q 20/403* (2013.01)

(58) Field of Classification Search
CPC ...... G06Q 20/065; G06Q 20/32; G06Q 20/36; G06Q 20/3825; G06Q 20/401
See application file for complete search history.

(56) References Cited

U.S. PATENT DOCUMENTS

| | | |
|---|---|---|
| 7,699,703 B2 | 4/2010 | Muir et al. |
| 7,771,272 B2 | 8/2010 | Soltys et al. |
| 8,087,983 B2 | 1/2012 | Longway |
| 8,506,387 B2 | 8/2013 | Brosnan et al. |
| 8,800,993 B2 | 8/2014 | Blaha et al. |
| 8,876,608 B2 | 11/2014 | Shepherd et al. |
| 9,367,835 B2 | 6/2016 | Nelson et al. |
| 9,483,911 B2 | 11/2016 | Backover et al. |
| 9,530,277 B2 | 12/2016 | Nelson et al. |
| 9,672,686 B2 | 6/2017 | Nguyen |

(Continued)

OTHER PUBLICATIONS

GamingStandard.com (Game to System (G2s) Versus Slot Accounting System (Sas), https://www.igsa.org/sites/default/files/documents/gsa-game-to-system-protocol_0.pdf, Sep. 26, 2020) (Year: 2020).*

(Continued)

*Primary Examiner* — Mark H Gaw
(74) *Attorney, Agent, or Firm* — Neal, Gerber & Eisenberg LLP

(57) ABSTRACT

Systems and methods that employ a virtual chip purchase voucher to transfer an amount funds between one or more gaming establishment accounts associated with a user and one or more gaming table components associated with a gaming establishment gaming table.

16 Claims, 5 Drawing Sheets

(56) References Cited

U.S. PATENT DOCUMENTS

| | | |
|---|---|---|
| 9,811,973 B2 | 11/2017 | Nguyen |
| 9,916,723 B2 | 3/2018 | Arnone et al. |
| 9,916,735 B2 | 3/2018 | Chun |
| 10,121,318 B2 | 11/2018 | Lemay et al. |
| 10,297,105 B2 | 5/2019 | Lemay et al. |
| 10,706,667 B1 | 7/2020 | Shepherd et al. |
| 2002/0152177 A1* | 10/2002 | Wolf ............... G06Q 20/32 705/64 |
| 2004/0030642 A1 | 2/2004 | Vindeby |
| 2005/0288083 A1 | 12/2005 | Downs |
| 2009/0069079 A1 | 3/2009 | Britt et al. |
| 2013/0065667 A1 | 3/2013 | Nelson et al. |
| 2013/0226784 A1* | 8/2013 | He ............... G06Q 40/02 705/38 |
| 2013/0232048 A1* | 9/2013 | Corner ............ G06Q 20/108 705/37 |
| 2015/0087377 A1 | 3/2015 | Yee et al. |
| 2015/0243133 A1 | 8/2015 | Nicholas |
| 2016/0284166 A1* | 9/2016 | Nelson ............ G07F 17/3267 |
| 2017/0092037 A1 | 3/2017 | Snow et al. |
| 2017/0092054 A1 | 3/2017 | Petersen et al. |
| 2017/0148249 A1 | 5/2017 | Richardson |
| 2018/0047249 A1 | 2/2018 | Nelson et al. |
| 2018/0253929 A1* | 9/2018 | Yee ............... G07F 17/3293 |
| 2020/0327780 A1 | 10/2020 | Higgins et al. |

OTHER PUBLICATIONS

GamingStandard.com (Game to System (G2s) Versus Slot Accounting System (Sas), htttps://www.igsa.org/sites/default/files/documents/gsa-game-to-system-protocol_O.pdf, Sep. 26, 2020) (Year: 2020).

* cited by examiner

VIRTUAL CHIP PURCHASE VOUCHERS

PRIORITY CLAIM

This application is a continuation of, claims the benefit of and priority to U.S. patent application Ser. No. 17/178,938, filed on Feb. 18, 2021, the entire contents of which is incorporated by reference herein.

BACKGROUND

In various embodiments, the systems and methods of the present disclosure employ one or more virtual chip purchase vouchers.

Gaming tables may enable one or more users to play one or more games wherein a user may be required to place a wager. A dealer may subsequently provide a user one or more playing cards. An award may be based on the user's playing cards and on the amount of the wager.

BRIEF SUMMARY

In certain embodiments, the present disclosure relates to a system including a processor, and a memory device that stores a plurality of instructions. When executed by the processor, the instructions cause the processor to determine whether to approve a virtual chip purchase voucher request associated with an amount of funds. When executed by the processor responsive to an approval of the virtual chip purchase voucher request, the instructions cause the processor to cause a transfer of the amount of funds from a first gaming establishment account associated with a user to an account of a gaming establishment chip management system, and responsive to receiving data associated with an issued virtual chip purchase voucher associated with the amount of funds, cause the received data associated with the issued virtual chip purchase voucher to be stored in association with a second gaming establishment account associated with the user.

In certain embodiments, the present disclosure relates to a gaming table component including a gaming table component processor, and a gaming table component memory device that stores a plurality of instructions. When executed by the gaming table component processor responsive to an occurrence of a virtual chip purchase voucher redemption event, the instructions cause the gaming table component processor to receive data associated with a virtual chip purchase voucher. Responsive to a validation of the virtual chip purchase voucher from a gaming establishment chip management system, the instructions cause the processor to cause a display, by a display device, of an amount of gaming chips to be provided to a user, wherein the amount of gaming chips corresponds to an amount of funds associated with the virtual chip purchase voucher.

In certain embodiments, the present disclosure relates to a system including a processor, and a memory device that stores a plurality of instructions. When executed by the processor, the instructions cause the processor to determine whether to approve a request for a return of a virtual chip purchase voucher associated with an amount of funds. When executed by the processor responsive to an approval of the request for the return of the virtual chip purchase voucher, the instructions cause the processor to deactivate the virtual chip purchase voucher, and communicate data that causes a transfer of the amount of funds associated with the virtual chip purchase voucher to a gaming establishment account associated with a user.

Additional features are described herein, and will be apparent from the following Detailed Description and the figures.

DETAILED DESCRIPTION

Figure 1:
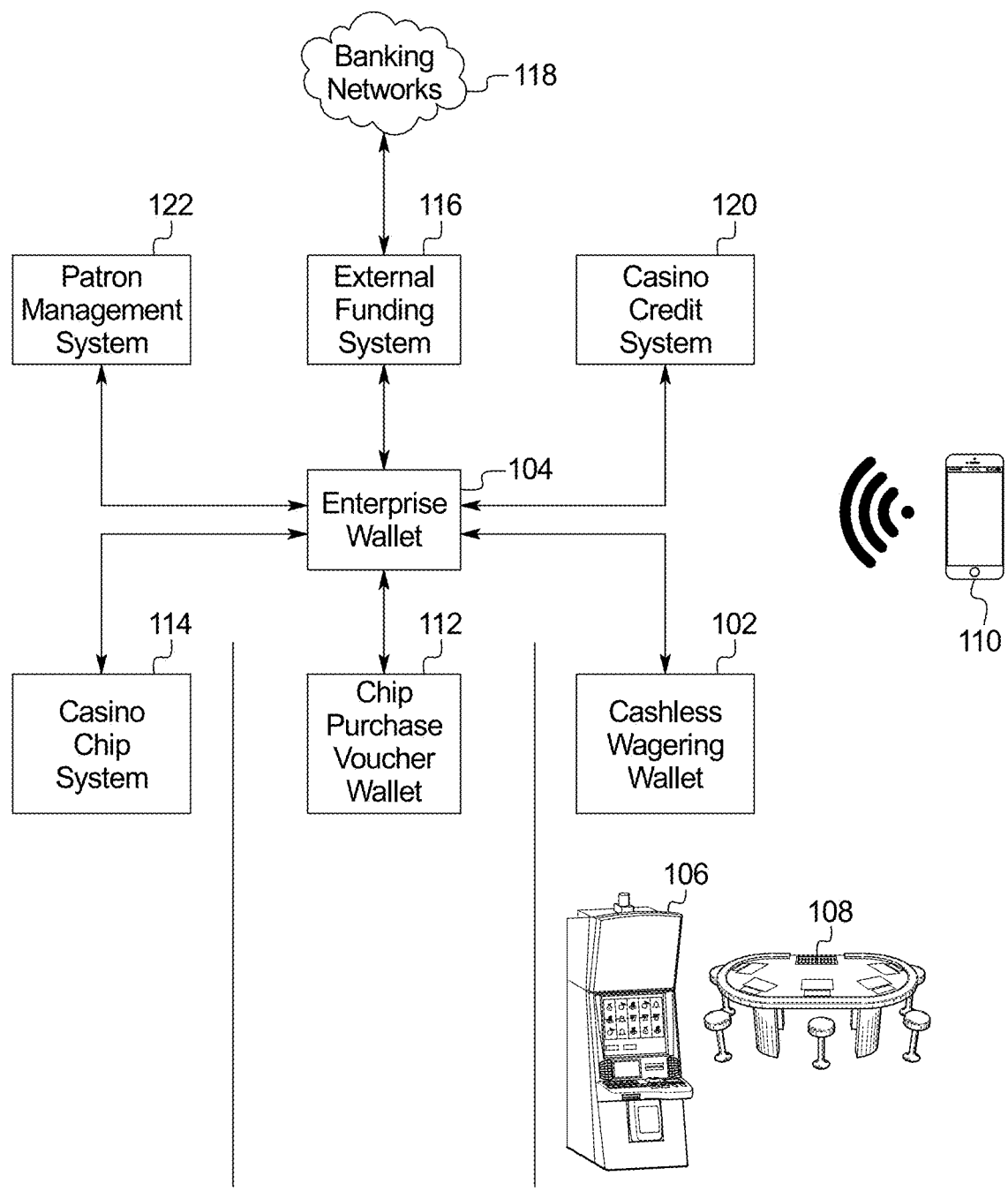
FIG. 1 is an example configuration of the architecture of a plurality of different components of the system of the present disclosure.

In various embodiments, the systems and methods of the present disclosure employ a virtual chip purchase voucher to transfer an amount funds between one or more gaming establishment accounts associated with a user and one or more gaming table components associated with a gaming establishment gaming table.

In certain embodiments, in view of the relatively limited avenues for a user to obtain gaming chips to be wagered at a gaming table, the system of the present disclosure provides that the funds maintained in one or more gaming establishment accounts are used to procure a virtual chip purchase voucher which is then exchanged for an associated quantity of gaming chips to be played at the gaming table. That is, rather than a user having to bring an amount of cash to a gaming table (to be exchanged by a dealer for a corresponding amount of gaming chips) and further rather than the user having to travel to a gaming establishment service desk and engage with gaming establishment personnel to purchase a chip purchase voucher exchangeable for a corresponding amount of gaming chips (which requires time and effort of all parties involved and fosters the spread of diseases in such interactions), in certain embodiments, the system enables a user to obtain a virtual chip purchase voucher without having to interact with any gaming establishment personnel. In these embodiments, the system enables a user to make one or more inputs, such as via a mobile device application executed on a mobile device, that result in an occurrence of a virtual chip purchase voucher acquisition event and a transfer of an amount of funds from a gaming establishment account maintained for that user to a component of a gaming establishment chip management system. Following the transfer of funds to obtain a virtual chip purchase voucher, the gaming establishment chip management system issues a virtual chip purchase voucher in association with an account maintained for the user. Such a virtual chip purchase voucher is associated with an amount of funds and a type of chipset (e.g., cash chips which may be redeemed for cash or non-negotiable chips which may not be redeemed for cash).

In certain embodiments, following a completion of the transfer of the amount of funds from the gaming establishment account maintained for that user to the component of the gaming establishment chip management system to acquire a virtual chip purchase voucher, the system enables the user to redeem the virtual purchase voucher for a quantity of gaming chips corresponding to the gaming chips associated with the acquired chip purchase voucher. In these embodiments, following the user making one or more inputs, such as via a mobile device application or via a gaming table component that result in an occurrence of a virtual chip purchase voucher redemption event, and following an authorization of the redemption and a deactivation of the redeemed virtual chip purchase voucher, gaming establishment personnel, such as a dealer at a gaming table, issues an amount of gaming chips (corresponding to the amount of funds of the virtual chip purchase voucher) to the user to be wagered at the gaming table.

In certain additional or alternative embodiments, in view of the relatively limited avenues for a user to return a chip purchase voucher, the system of the present disclosure utilizes a mobile device application executed on the mobile device to return a virtual chip purchase voucher, which results in an amount of funds corresponding to the amount of the returned virtual chip purchase voucher being transferred to one or more gaming establishment accounts. That is, rather than a user having to bring an unredeemed chip purchase voucher to a gaming establishment service desk, such as a casino cage, and engage with gaming establishment personnel to return an unredeemed chip purchase voucher (which requires time and effort of all parties involved and also fosters the spread of diseases in such interactions), in certain embodiments, the system enables a user to return an unredeemed virtual chip purchase voucher without interacting with gaming establishment personnel. In these embodiments, following the user making one or more inputs, such as via a mobile device application, that result in an occurrence of a virtual chip purchase voucher return event, the system operates to deactivate the created virtual chip purchase voucher and facilitate a transfer of an amount of funds (corresponding to the amount of funds of the returned virtual chip purchase voucher) to a gaming establishment account maintained for the user.

It should be appreciated that these embodiments which support the movement of funds to and from a gaming table using a virtual chip purchase voucher provide for a relatively more efficient experience for users (e.g., a user does not need to first obtain cash or a paper chip purchase voucher to bring to a gaming table to be exchanged for gaming chips) and overcomes certain security concerns (e.g., users and/or gaming establishment personnel carrying large sums of cash) associated with both cash-based gaming and ticket voucher-based gaming. In addition to providing a relatively safer environment via the reduction of uses of cash, the system of the present disclosure reduces face-to-face interactions between users and gaming establishment personnel, thereby reducing risks associated with the spread of diseases between such parties. Moreover, such a configuration further reduces the use of paper chip purchase vouchers (which certain gaming table dealers may accept for gaming chips) and any ink associated with the production of such paper chip purchase vouchers to reduce the amount of waste produced by gaming establishments. Such a reduction in the amount of waste produced by gaming establishments provides an environmental benefit of implementing the system of the present disclosure.

In various embodiments, the present disclosure is directed to a gaming establishment fund management system including various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (i.e., cashless wagering wallets), virtual chip purchase voucher accounts (i.e., chip purchase voucher wallets) and/or gaming establishment retail accounts (i.e., gaming establishment retail wallets) associated with or otherwise maintained for a user, such as a player, collectively form an enterprise account (i.e., an integrated gaming establishment fund management wallet) that the user, such as a player, may access to transfer funds, transfer virtual chip purchase vouchers and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In certain embodiments, the gaming establishment fund management system includes a first cashless wagering system that maintains a first cashless wagering account. In these embodiments, a user, such as a player of an electronic gaming machine ("EGM"), utilizes a mobile device application running on a mobile device and/or a physical instrument (e.g., a smart card or a user issued magnetic striped card which the user utilizes via inserting the card into a player tracking unit) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a cashless wagering wallet 102 (e.g., a first cashless wagering account) which is in communication with the enterprise wallet 104. In this illustrated example, to facilitate the transfer of funds from this cashless wagering account to a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments (not shown), the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table.

In various embodiments, the gaming establishment fund management system additionally or alternatively includes or is otherwise associated with one or more chip purchase voucher systems. Each chip purchase voucher system is associated with or otherwise maintain one or more chip purchase voucher accounts that store zero, one or more procured virtual chip purchase vouchers. In these embodiments, a user utilizes a mobile device application running on a mobile device and/or a physical instrument (e.g., a smart card or a user issued magnetic striped card) to facilitate the transfer of any virtual chip purchase vouchers between a gaming establishment chip management system and a chip purchase voucher account and/or to facilitate the transfer of any stored virtual chip purchase vouchers between a chip purchase voucher account and a gaming table component associated with a gaming table. For example, as seen in FIG. 1, the gaming establishment fund management system includes or is otherwise in communication with a chip purchase voucher system (not shown) that maintains a chip purchase voucher wallet 112 (e.g., a chip purchase voucher account) which is in communication with the enterprise wallet 104. In this illustrated example, to facilitate the transfer of a chip purchase voucher from a chip purchase voucher account to a gaming table component (not shown) associated with a gaming table 108 as part of a redemption of the chip purchase voucher, the system utilizes a mobile device 110 running a mobile device application that interfaces with one or more components of the system of the present disclosure.

In various embodiments (not shown), in addition to or an alternative of maintaining one or more cashless wagering accounts via one or more cashless wagering systems and/or maintaining one or more chip purchase voucher accounts via one or more chip purchase voucher systems, the gaming establishment fund management system includes or is otherwise associated with one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, to facilitate the transfer of funds from a gaming establishment retail account to an account associated with a retailer to purchase goods and/or services from the retailer, the system utilizes a retail wallet identity, such as a mobile device running a mobile device application that interfaces with a point-of-sale terminal of a retail point-of-sale system of the retailer, and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a retailer. It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with one or more gaming establishment chip management systems which each issue one or more chip purchase vouchers and/or receive any returned chip purchase vouchers. For example, as seen in FIG. 1, the gaming establishment fund management system that maintains the enterprise wallet 104 is in communication with a gaming establishment chip management system (i.e., the casino chip system 114) to facilitate the procurement, redemption and/or return of zero, one or more chip purchase vouchers. In this illustrated example, to facilitate a transfer of funds between a cashless wagering account (or other account associated with or in communication with the gaming establishment fund management system) and the gaming establishment chip management system to procure a chip purchase voucher, redeem a chip purchase voucher and/or return a chip purchase voucher, the system utilizes a mobile device 110 running a mobile device application. It should be appreciated that while illustrated as the gaming establishment fund management system being in communication with one or more gaming establishment chip management systems, in different embodiments, any component or sub-system of the present disclosure can be in communication with one or more gaming establishment chip management systems.

In certain embodiments, the gaming establishment fund management system is in communication with one or more external funding sources which maintain one or more external accounts for the user. For example, as seen in FIG. 1, the gaming establishment fund management system that maintains the enterprise wallet 104 is in communication with an external funding system 116 which is in communication with a network of one or more banks or other financial institutions (i.e., the banking networks 118) which operate to electronically transfer funds from the user's accounts maintained at such banks or financial institutions to one or more of the accounts maintained by the gaming establishment fund management system and/or provide financial information associated with the user's accounts maintained at such banks or financial institutions. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). In this illustrated example, the system utilizes a mobile device 110 running a mobile device application to facilitate the transfer of funds from an external account and/or facilitate the transfer of financial information associated with such external accounts. It should be appreciated that while illustrated as the gaming establishment fund management system being in communication with one or more external funding sources, in different embodiments, any component or sub-system of the present disclosure can be in communication with one or more external funding sources.

In certain embodiments, the gaming establishment fund management system is in communication with one or more credit systems which each issue the user one or more lines of credit or markers. For example, as seen in FIG. 1, the gaming establishment fund management system that maintains the enterprise wallet 104 is in communication with a gaming establishment credit system (i.e., the casino credit system 120) to facilitate the establishment of an amount of funds in the gaming establishment fund management account via one or more lines of credits. In this illustrated example, to facilitate a transfer of funds from the line of credit issued by the credit system to a cashless wagering account (or other account associated with or in communication with the gaming establishment fund management system) and/or between the line of credit and the gaming establishment chip management system to procure a chip purchase voucher and/or return a chip purchase voucher, the system utilizes a mobile device 110 running a mobile device application. It should be appreciated that while illustrated as the gaming establishment fund management system being in communication with one or more credit systems, in different embodiments, any component or sub-system of the present disclosure can be in communication with one or more credit systems.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In certain embodiments, the gaming establishment fund management system is in communication with one or more gaming establishment patron management systems. For example, as seen in FIG. 1, the gaming establishment fund management system (i.e., enterprise wallet 104) is in communication with one or more gaming establishment patron management systems (i.e., the patron management system 122) that assists in the creation of one or more accounts as well as monitor activities at various points of contact associated with a gaming establishment and provides rewards, such as redeemable player tracking points, in association with such activities. It should be appreciated that any component or sub-system of the present disclosure can be in communication with one or more gaming establishment patron management systems.

In certain embodiments, the system utilizes one mobile device application to interact with the different components of the gaming establishment fund management system to access funds maintained in the different gaming establishment accounts associated with the user, and/or engage in a transaction associated with one or more virtual chip purchase vouchers. For example, utilizing the same mobile application, a mobile device interacts with both the first cashless wagering system of the gaming establishment fund management system and the gaming establishment chip management system in communication with the gaming establishment fund management system. In certain embodiments, the system utilizes multiple mobile device applications to interact with the different components of the gaming establishment fund management system to access funds maintained in the different gaming establishment accounts associated with the user, and/or engage in a transaction associated with one or more virtual chip purchase vouchers. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a machine-readable code, such as a QR code).

It should be appreciated that in different embodiments, in addition to or alternatively from utilizing a mobile device running a mobile device application to access funds associated with different gaming establishment accounts, and/or engage in a transaction associated with one or more virtual chip purchase vouchers, the system utilizes a kiosk, an EGM, a remote host controlled service window displayed by an EGM, a display device/input device associated with a seat-level gaming table component, a display device/input device associated with a table-level gaming table component, a display device/input device associated with a mobile gaming table component, a component of a gaming establishment patron management system, such as a player tracking unit, and/or a gaming establishment interface, such as a casino desk. It should be further appreciated that while illustrated in FIG. 1 as using a mobile device running a mobile device application to access funds associated with different gaming establishment accounts (e.g., a cashless wagering account), and/or engage in a transaction associated with one or more virtual chip purchase vouchers, a physical instrument, such as a smart card or a user issued magnetic striped card may additionally or alternatively be utilized to enable a user access to such gaming establishment accounts, and/or engage in a transaction associated with one or more virtual chip purchase vouchers.

In various embodiments, the system of the present disclosure enables a user to make one or more inputs, such as via a mobile device executing a mobile device application, to obtain a virtual chip purchase voucher via a transfer of funds from a gaming establishment account to an account associated with a gaming establishment chip management system. In these embodiments, following the user making one or more inputs, such as via a mobile device executing a mobile device application, indicating one or more of an amount of the chip purchase voucher, a source of funds to procure the chip purchase voucher, a chipset of the chip purchase voucher (i.e., cash chips or non-negotiable chips), and/or a configuration of the chips of the chipset of the chip purchase voucher (e.g., a denomination of the chips of the chip purchase voucher), the mobile device application interfaces (either directly or indirectly through one or more intermediaries, such as a chip purchase voucher system) with a gaming establishment chip management system to request an issuance of a chip purchase voucher as specified by the user.

Upon receiving the request to issue a chip purchase voucher, the gaming establishment chip management system operates with one or more components of the gaming establishment fund management system to determine whether or not to issue the requested chip purchase voucher. In these embodiments, to pay for the requested chip purchase voucher, the gaming establishment chip management system interfaces with the gaming establishment fund management system (or another system in communication with the gaming establishment fund management system) to determine whether or not the source of funds indicated by the user (and/or another source of funds available to the user) is associated with an adequate balance to cover the costs of the requested chip purchase voucher.

If the gaming establishment chip management system determines to issue the requested chip purchase voucher, then following the payment of the chip purchase voucher from the source of funds, the gaming establishment chip management system issues a chip purchase voucher and communicates data associated with the issued chip purchase voucher to a chip purchase voucher system which retains such data in association with the user. That is, following the purchase of a chip purchase voucher and any notification to the user, such as via the mobile device application, of the successful procurement of the requested chip purchase voucher, one or more components of (or otherwise associated with) the gaming establishment fund management system, such as the chip purchase voucher system, store the chip purchase voucher (and/or an identifier associated with the chip purchase voucher, such as a chip purchase voucher redemption code employed to redeem a chip purchase voucher) in association with the user, such as in a chip purchase voucher wallet associated with the user.

On the other hand, if the gaming establishment chip management system determines not to issue the requested chip purchase voucher, the gaming establishment chip management system notifies the user, such as via the mobile device application, of the unsuccessful procurement of the requested chip purchase voucher. In other words, if the gaming establishment chip management system interfacing with the gaming establishment fund management system (or another system in communication with the gaming establishment fund management system) results in a determination that the source of funds indicated by the user (and/or another source of funds available to the user) is not associated with an adequate balance to cover the costs of the requested chip purchase voucher, the gaming establishment chip management system does not issue the requested chip purchase voucher and alerts the user of the denial. In certain embodiments, the communication to the user includes one or more reasons for the denied request (e.g., insufficient funds) and any ways for the user to cure such deficiencies for future requests.

In certain embodiments, the source of funds to procure a chip purchase voucher includes a gaming establishment account associated with a user, such as a cashless wagering account maintained by a cashless wagering system. In these embodiments, the system enables an amount of funds associated with the gaming establishment account maintained for the user to be used to purchase a chip purchase voucher. Put differently, the system enables a user to utilize an interface, such as a mobile device application, to facilitate a transfer an amount of funds from a gaming establishment account maintained for the user to an account of a gaming establishment chip management system in exchange for a chip purchase voucher.

In these embodiments, following a user requesting a chip purchase voucher, the system determines whether to authorize the exchange of an amount of funds for the chip purchase voucher. Such a determination includes the gaming establishment chip management system interfacing with the gaming establishment fund management system to determine if the amount of funds in the gaming establishment account maintained for the user is adequate to cover the cost of the requested chip purchase voucher and/or whether any restrictions are in place that would limit or prevent the procurement of the chip purchase voucher. If the system determines not to authorize the exchange of an amount of funds for a chip purchase voucher, the system communicates a denial to the user and does not cause any chip purchase vouchers to be issued. That is, upon the gaming establishment chip management system operating with the gaming establishment fund management system to determine that the gaming establishment account associated with the user lacks the funds to pay for the chip purchase voucher, the gaming establishment chip management system does not issue the requested chip purchase voucher and rather causes a denial to be communicated to the user.

On the other hand, if the system determines to authorize the exchange of an amount of funds for a chip purchase voucher, the gaming establishment fund management system transfers the amount of funds for the chip purchase voucher from the gaming establishment account associated with the user to an account associated with the gaming establishment chip management system and updates the gaming establishment account associated with the user to reflect this transfer. In this embodiment, in association with the transfer of an amount of funds to pay for the requested chip purchase voucher, the system communicates an authorization to the gaming establishment chip management system. Upon receiving data associated with the authorized purchase of a chip purchase voucher for an amount of funds transferred from the gaming establishment account, the gaming establishment chip management system creates the requested chip purchase voucher. Such a created chip purchase voucher is associated with chip purchase voucher identification information maintained by the gaming establishment chip management system to identify that chip purchase voucher for subsequent validation upon a redemption or return of that chip purchase voucher.

Figure 2A:
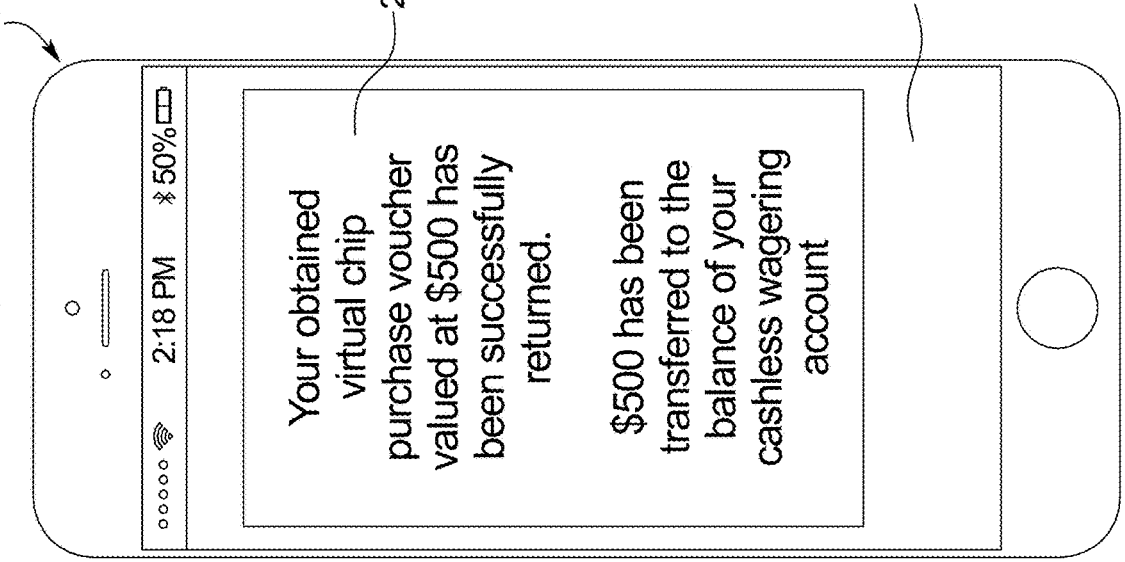
FIGS. 2A, 2B, and 2C are example graphical user interfaces displayed in connection with conduction transactions involving a virtual chip purchase voucher.

In certain embodiments, following the creation of the chip purchase voucher, the gaming establishment chip management system (and/or other component of the present disclosure) communicates data to the mobile device of the user which results in the mobile device application displaying a confirmation of the purchase of the chip purchase voucher. For example, as seen in FIG. 2A, a mobile device application 220 of a mobile device 210 displays a message to the user that they have used $500 from their cashless wagering account to obtain a virtual chip purchase voucher (including an image of a machine-readable code associated with the virtual chip purchase voucher and instructions on how to redeem the obtained virtual chip purchase voucher) 230*a*.

In certain embodiments, following the creation of a chip purchase voucher, the gaming establishment chip management system stores data associated with the chip purchase voucher in one or more databases. For example, the gaming establishment chip management system includes a chip purchase voucher database which stores various fields of data utilized by the gaming establishment chip management system to track issued chip purchase vouchers. In different embodiments, the database fields of the chip purchase voucher database which the gaming establishment chip management system utilizes includes, but is not limited to: a primary key (i.e., an index for the record in the table); a chip purchase voucher validation number (i.e., the validation number associated with the issued ticket); a chip purchase voucher redemption code (e.g., a machine-readable code associated with the redemption of a chip purchase voucher); a ticket state (e.g., a state of a ticket as being in an issued state, a redeemed state or a returned state); an issuance date (i.e., the date when the chip purchase voucher was issued); a property address associated with the chip purchase voucher issuance; an amount of funds associated with the chip purchase voucher; a type of chipset associated with the chip purchase voucher; a source of funds associated with the chip purchase voucher; a denomination configuration of the amount of funds associated with the chip purchase voucher; any expiration date associated with the chip purchase voucher; a device identification associated with the issuance of the chip purchase voucher; any image of the chip purchase voucher (e.g., an image of a front of the chip purchase voucher and/or an image of a back of the chip purchase voucher); any redemption date (i.e., the date the chip purchase voucher was redeemed at (if the chip purchase voucher is in the redeemed state)); redeemed at information (i.e., the device where the chip purchase voucher was redeemed (if the chip purchase voucher is in the redeemed state)); any return date (i.e., the date the chip purchase voucher was returned at (if the chip purchase voucher is in the returned state)); returned at information (i.e., the device where the chip purchase voucher was returned (if the chip purchase voucher is in the returned state)); and/or a data signature (i.e., a signature of the data associated with the chip purchase voucher to prevent tampering by casino employees).

In certain embodiments, following the creation of a chip purchase voucher, the chip purchase voucher system additionally or alternatively stores data associated with the chip purchase voucher in one or more databases. In certain embodiments, the gaming establishment fund management system additionally or alternatively stores data associated with the created chip purchase voucher in one or more gaming establishment accounts associated with the user, such as the chip purchase voucher account associated with the user and/or the cashless wagering account associated with the user. In certain embodiments, the gaming establishment chip management system stores data associated with the chip purchase voucher in one or more databases and the gaming establishment fund management system stores data associated with the created chip purchase voucher, such as storing the chip purchase voucher redemption code associated with the created chip purchase voucher, in one or more gaming establishment accounts associated with the user. In certain embodiments, the gaming establishment chip management system stores data associated with the chip purchase voucher in one or more databases and the mobile device application stores data associated with the created chip purchase voucher, such as storing the chip purchase voucher redemption code associated with the created chip purchase voucher.

In certain embodiments, the source of funds to procure a chip purchase voucher includes a line of credit associated with a user. In these embodiments, the system enables an amount of funds drawn from a line of credit associated with the user to be used to purchase a chip purchase voucher. Put differently, the system enables a user to utilize an interface, such as a mobile device application, to facilitate a transfer an amount of available funds from a gaming establishment line of credit to an account associated with a gaming establishment chip management system in exchange for a requested chip purchase voucher.

In certain embodiments, the source of funds to procure a chip purchase voucher includes an external account associated with a user. In these embodiments, the system enables an amount of funds transferred from an external account associated with the user to be used to purchase a chip purchase voucher. In other words, the system enables a user to utilize an interface, such as a mobile device application, to facilitate a transfer an amount of available funds from an external account to an account associated with the gaming establishment chip management system in exchange for a requested chip purchase voucher.

In certain embodiments, the source of funds to procure a chip purchase voucher includes an amount of funds deposited in an EGM. In one such embodiment, the system enables a user that has an amount of cash (or other forms of payment used to increase a balance of an EGM, such as a cashless ticket voucher) to utilize an EGM to convert the cash to one or more chip purchase vouchers via the user first depositing the amount of cash into the EGM and then subsequently causing the EGM to transfer (either pre or post any gaming activity) an amount of a credit balance of the EGM to an account associated with a gaming establishment chip management system in exchange for a requested chip purchase voucher.

In certain embodiments, the source of funds to procure a chip purchase voucher includes an amount of funds deposited in a kiosk. In one such embodiment, the system enables a user that has an amount of cash (or other forms of payment used to increase a balance of a kiosk, such as a cashless ticket voucher) to utilize a kiosk to convert the cash to one or more chip purchase vouchers via the user depositing the amount of cash into the kiosk and then subsequently causing the kiosk to transfer the deposited amount to an account associated with a gaming establishment chip management system in exchange for a requested chip purchase voucher.

In certain embodiments, the source of funds to procure a chip purchase voucher includes an amount of funds provided to a gaming establishment interface. In one such embodiment, the system enables a user that has an amount of cash (or other forms of payment) to utilize a gaming establishment interface to convert the cash to one or more chip purchase vouchers via the user providing the amount of cash to the gaming establishment interface of the gaming establishment chip management system in exchange for a requested chip purchase voucher.

In certain embodiments, the source of funds to procure a chip purchase voucher includes an amount of funds provided to a retail interface, such as a kiosk or cashier at a retail establishment. In one such embodiment, the system enables a user that has an amount of cash (or other forms of payment) to utilize a retail interface to convert the cash to one or more chip purchase vouchers via the user providing the amount of cash to the retail interface in exchange for a chip purchase voucher.

In certain embodiments, the system provides a user a benefit in association with the user obtaining a chip purchase voucher, such as the user causing the transfer an amount of funds from a cashless wagering account to purchase a chip purchase voucher. In one such embodiment, the system enables the user to join a loyalty program wherein if the user purchases a chip purchase voucher associated with at least a threshold amount of gaming chips in any form, the system associates a loyalty award, such as a quantity of monetary credits (e.g., a commission of the purchase amount of the chip purchase voucher) and/or a quantity of non-monetary credits (e.g., a quantity of points) with the user. In another such embodiment, the system enables the user to join a loyalty program wherein if the user purchases a chip purchase voucher associated with at least a threshold amount of gaming chips in a designated form, such as at least a threshold amount of non-negotiable chips, the system associates a loyalty award, such as a quantity of monetary credits and/or a quantity of non-monetary credits with the user. It should be appreciated that any suitable benefit that is associated with the chip purchase voucher (e.g., an increase of an amount of the chip purchase voucher by a static amount or percentage) or independent of the chip purchase voucher (e.g., a quantity of player tracking points redeemable for one or more comps) may be provided as the loyalty award.

In various embodiments, following a user obtaining one or more virtual chip purchase vouchers, the system of the present disclosure additionally or alternatively enables the user to utilize an interface, such as a mobile device application, to return one or more chip purchase vouchers in exchange for a return of the amount of funds used to procure such chip purchase vouchers.

In certain embodiments, the system enables a user to make one or more inputs, such as via an interface of a mobile device application, to view any virtual chip purchase vouchers associated with the user, such as stored in a chip purchase voucher wallet. In these embodiments, following the user selecting, via the interface of the mobile device application, a virtual chip purchase voucher to return, the system determines a chip purchase voucher validation number (and/or other chip purchase voucher identifying information) of the selected virtual chip purchase voucher.

In various embodiments, following the determination of the chip purchase voucher validation number (and/or other chip purchase voucher identifying information) and any verification determinations associated with the chip purchase voucher to be returned, the gaming establishment fund management system (and/or a component of the gaming establishment fund management system such as the chip purchase voucher system) operates with the gaming establishment chip management system to determine whether to authorize the return of the chip purchase voucher by verifying that the chip purchase voucher is a valid chip purchase voucher which is authentic and has not been previously returned, redeemed and/or voided by the gaming establishment chip management system. In other words, the system determines, following the selection of a chip purchase voucher to return, whether or not to accept the return of the chip purchase voucher.

In certain embodiments, if the gaming establishment chip management system determines not to authorize the return of the chip purchase voucher because the chip purchase voucher is inauthentic or otherwise invalid, such as being previously returned, redeemed or voided by the gaming establishment chip management system, the gaming establishment chip management system communicates a denial to the component of the gaming establishment fund management system, such as the chip purchase voucher system, and does not complete the chip purchase voucher return. In certain embodiments, the gaming establishment fund management system, such as the chip purchase voucher system, then conveys one or more messages to the user regarding the denial of the chip purchase voucher return, such as via the mobile device used to attempt to return the chip purchase voucher.

On the other hand, if the gaming establishment chip management system determines to authorize the return of the chip purchase voucher because the chip purchase voucher is valid and authentic, the gaming establishment chip management system updates one or more databases regarding the return and associated deactivation of such a chip purchase voucher. In these embodiments, once a chip purchase voucher is returned and deactivated, that chip purchase voucher cannot be subsequently returned or redeemed.

Figure 2B:
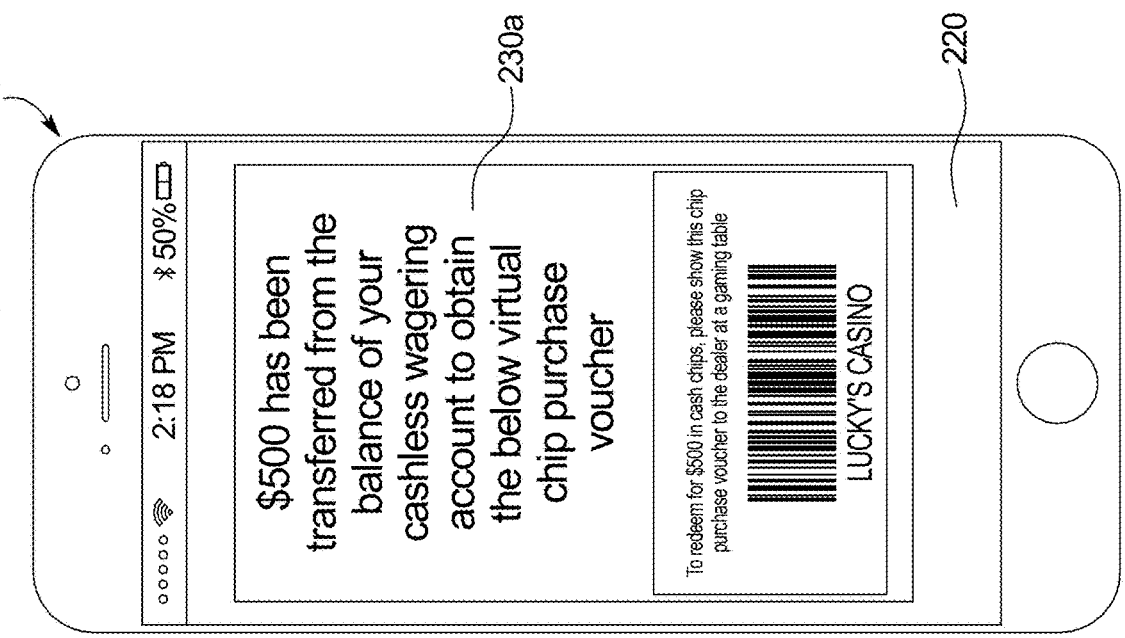

In addition to updating one or more chip purchase voucher databases to reflect the successful return and deactivation of the chip purchase voucher, the gaming establishment chip management system notifies the gaming establishment fund management system which operates to cause a payment to be generated for the amount of the returned chip purchase voucher. In certain embodiments, the system conveys one or more messages to the user regarding the payment for the returned chip purchase voucher, such as via the mobile device used to attempt to return the chip purchase voucher. For example, as seen in FIG. 2B, a mobile device application 220 of a mobile device 210 displays a message to the user that the virtual chip purchase voucher obtained for $500 has been returned and $500 has been transferred to their cashless wagering account 230b.

In certain embodiments, the payment that the system utilizes in association with a mobile device facilitated return of a chip purchase voucher includes a transfer to a gaming establishment account of a gaming establishment fund management system. In these embodiments, in association with the return of a chip purchase voucher, the gaming establishment chip management system operates with one or more components of the gaming establishment fund management system to transfer the amount of the chip purchase voucher from an account associated with the gaming establishment chip management system to the gaming establishment account identified by the user of the mobile device as the destination of the funds of the returned chip purchase voucher.

In certain embodiments, the payment that the system utilizes in association with a mobile device facilitated return of a chip purchase voucher includes a transfer to an external funding source which maintains one or more external accounts. For example, the gaming establishment chip management system operates with one or more components of the gaming establishment fund management system to cause an electronic transfer of funds associated with the returned chip purchase voucher to the user's external account maintained at a bank or financial institution. In certain embodiments wherein the form of payment for the returned chip purchase voucher includes a transfer to an external funding sources which maintain one or more external accounts, the system of the present disclosure enables the mobile device application to communicate directly with the component of the external funding system such that details of the account which the funds represented by the chip purchase voucher are to be transferred bypass the component of the gaming establishment fund management system. Such a configuration provides that the component of the gaming establishment fund management system does not need to comply with various banking security standards, such as the processing card industry standards, because only the component of the external funding system is aware of the destination account details while the component of the gaming establishment fund management system is unaware of or otherwise immune to those details. In these embodiments, the holder of the chip purchase voucher interfaces with the mobile device application to enter the details of the account they wish to transfer the funds represented by the chip purchase voucher to, wherein the entered information is represented by a token that is passed back to the mobile application. This token (which points to banking information in the banking network) is then leveraged to trigger the transfer to the holder's selected account after the chip purchase voucher has been successfully returned.

In certain embodiments, the form of payment includes an electronic check made out to the user which is electronically presentable at a financial institution for the amount of funds associated with the returned chip purchase voucher. In these embodiments, the gaming establishment chip management system with one or more components of the gaming establishment fund management system to transfer the amount of the chip purchase voucher from an account associated with the gaming establishment chip management system to an electronic check. Specifically, to issue a check of such an embodiment, the system initiates a fund transfer wherein an amount of funds corresponding to part or all of the amount of the returned chip purchase voucher is transferred from a gaming establishment account which holds the funds associated with the gaming establishment chip management system, such as a banking account associated with the gaming establishment, to a checking account of a financial institution which issues such checks, such as a checking account associated with a bank that issues the checks associated with returned chip purchase vouchers. In certain other embodiments, the gaming establishment account which holds the funds associated with the gaming establishment chip management system, such as a banking account associated with the gaming establishment, also functions as a checking account associated with check writing features to issue the checks associated with returned chip purchase vouchers.

It should thus be appreciated that the utilization of a mobile device application to return, in a relatively more secure manner, one or more chip purchase vouchers of the present disclosure not only provides a relatively more secure environment for a user (via reducing or eliminating the need for the user to carry cash on their person after returning a chip purchase voucher, thus diminishing the risks that such cash may be lost or stolen), but also benefits the gaming establishment by freeing the gaming establishment up from also having to carry relatively large amounts of cash in cash dispensing kiosks (and thus reduces the use of such cash dispensing kiosks, the system reduces the wear and tear on such devices thus prolonging the operational life on these devices). Such a configuration of utilizing a mobile device to return chip purchase vouchers of the present disclosure further reduces the amount of cash transactions in a gaming establishment which reduces or eliminates human errors which often occur when chip purchase vouchers are returned at gaming establishment interfaces to not only protect the user (if the gaming establishment personnel provides the gaming establishment patron less cash than the patron deserves) but also protect the gaming establishment (if the gaming establishment personnel inadvertently or fraudulently provides the patron more cash than the patron deserves).

In various embodiments, the system of the present disclosure additionally or alternatively enables a user, such as a player at a gaming table, to make one or more inputs, such as via a mobile device executing a mobile device application and/or a chip purchase voucher redemption device, to redeem a chip purchase voucher, wherein following such a redemption, gaming establishment personnel issue the user at the gaming table an amount of gaming chips (corresponding to the redeemed chip purchase voucher) for wagering on one or more plays of one or more games at the gaming table.

In one embodiment, the gaming table is an intelligent gaming table which enables one or more users to play one or more suitable games by placing one or more wagers utilizing gaming chips. In this embodiment, a gaming table component employed to redeemed a chip purchase voucher is part of (or otherwise associated with) the intelligent gaming table and includes zero, one or more input devices (to receive inputs to facilitate the redemption of the chip purchase voucher), and zero, one or more display devices (to display information to the user and/or gaming establishment personnel regarding a chip purchase voucher). In certain embodiments, the gaming table component additionally includes a communication interface (such as a wireless communication interface to communicate with a mobile device regarding the redemption of a chip purchase voucher) and/or a printer (to generate a receipt regarding the redemption of a chip purchase voucher).

In another embodiment, the gaming table is a non-intelligent gaming table including a suitable support structure, such as one or more legs, a playing surface and a dealer position. In this embodiment, a gaming table component is separate from but associated with the gaming table and includes zero, one or more input devices (to receive inputs to facilitate the redemption of the chip purchase voucher), and zero, one or more display devices (to display information to the user and/or gaming establishment personnel regarding a chip purchase voucher). In certain embodiments, the gaming table component additionally includes or is otherwise associated with a communication interface (such as a wireless communication interface to communicate with a mobile device regarding the redemption of a chip purchase voucher), a user identification device associated with the gaming table (such as a card reader to enable the user to log into the gaming table) and/or a printer (to generate a receipt regarding the redemption of a chip purchase voucher).

In another embodiment, regardless of if an intelligent gaming table or a non-intelligent gaming table are utilized, the gaming table component is a mobile gaming table component associated with one or more of such gaming tables. In this embodiment, the mobile gaming table component is associated with gaming establishment personnel. For example, a tablet or mobile device associated with a gaming establishment mobile staff member qualifies as a mobile gaming table component. In these embodiments, the mobile gaming table component includes zero, one or more input devices (to receive inputs to facilitate the redemption of a chip purchase voucher), and zero, one or more display devices (to display information to the user and/or gaming establishment personnel regarding a chip purchase voucher). The mobile gaming table component additionally includes or is otherwise associated with a communication interface (such as a wireless communication interface to communicate with a mobile device regarding the redemption of a chip purchase voucher), a user identification device associated with the gaming table (such as a card reader to enable the user to log into the gaming table) and/or a printer (to generate a receipt regarding the redemption of a chip purchase voucher).

In various embodiments, if a user wants to redeem a chip purchase voucher at a gaming table utilizing a mobile device application, then following the user accessing the mobile device application and selecting a chip purchase voucher to redeem, the mobile device application determines a chip purchase voucher redemption code of the selected virtual chip purchase voucher. In one such embodiment, the chip purchase voucher redemption code is stored by the mobile device application. In another such embodiment, the chip purchase voucher redemption code is stored in association with a gaming establishment account maintained for the user and communicated to the mobile device application following the user selecting a chip purchase voucher to redeem.

In certain embodiments, following the determination of the chip purchase voucher redemption code associated with the chip purchase voucher to be redeemed and any verification determinations associated with the chip purchase voucher to be redeemed, the mobile device application displays a machine-readable code associated with the chip purchase voucher redemption code, such as a QR code. In these embodiments, upon the scanning of the machine-readable code by gaming establishment personnel and/or a chip purchase voucher redemption device to identify the chip purchase voucher to be redeemed, the gaming establishment chip management system determines whether to authorize the redemption of the chip purchase voucher by verifying that the chip purchase voucher is a valid chip purchase voucher which is authentic and has not been previously returned, redeemed and/or voided by the gaming establishment chip management system. In other words, the system determines, following the selection of a chip purchase voucher to redeem, whether or not to accept the redemption of the chip purchase voucher.

In various embodiments, if a user wants to redeem a chip purchase voucher at a gaming table utilizing a mobile device application, then following the user accessing the mobile device application and selecting a chip purchase voucher to redeem, the user pairs or links their mobile device with the gaming table component. In certain embodiments, to pair the mobile device with the gaming table component, the mobile device application prompts the user to cause the mobile device to engage the gaming table component, such as prompting the user to tap the mobile device to a player tracking card reader or other designated location(s) of the gaming table component. After such engagement and following receipt of the user inputted data associated with the selection of a chip purchase voucher to be redeemed and any confirmation from the user that they approve of the redemption, the mobile device application communicates, via a wireless communication protocol, data associated with the chip purchase voucher to be redeemed to the gaming table component. The gaming table component then communicates one or more messages to the gaming establishment chip management system identifying the chip purchase voucher to be redeemed. Upon receipt of such information, the gaming establishment chip management system determines whether to authorize the redemption of the chip purchase voucher by verifying that the chip purchase voucher is a valid chip purchase voucher which is authentic and has not been previously returned, redeemed and/or voided by the gaming establishment chip management system.

In certain embodiments, the system enables the user to initiate a redemption of a chip purchase voucher by enabling the user to access a chip purchase voucher stored in association with a gaming establishment account via inserting or swiping their magnetic striped playing account card at a card reader associated with the gaming table. In certain other embodiments, the system enables the user to initiate a redemption of a chip purchase voucher by enabling the user to access a chip purchase voucher stored in association with a gaming establishment account via entering a card number of a playing identification card at an input device, such as a keypad, associated with the gaming table. In these embodiments, using either a universal input device accessible by each of the users at the gaming table or an individual input device associated with an individual position or seat at the gaming table, the system enables the user to make one or more inputs identifying the chip purchase voucher to be redeemed. In these embodiments, following receipt of the user inputted data associated with the attempted redemption of a chip purchase voucher, the gaming table component proceeds with operating with the gaming establishment chip management system to determine whether to authorize the redemption of the chip purchase voucher by verifying that the chip purchase voucher is a valid chip purchase voucher which is authentic and has not been previously returned, redeemed and/or voided by the gaming establishment chip management system.

In certain embodiments, the system enables the user to initiate a redemption of a chip purchase voucher by enabling the user to access a chip purchase voucher stored in association with a gaming establishment account via inserting or swiping their magnetic striped playing account card at a mobile card reader of a mobile gaming table component, such as a mobile workstation associated with a gaming establishment mobile staff member. In certain other embodiments, the system enables the user to initiate a redemption of a chip purchase voucher by enabling the user to access a chip purchase voucher stored in association with a gaming establishment account via entering a card number of a playing identification card at an input device, such as a keypad, of a mobile gaming table component, such as a mobile workstation associated with a gaming establishment mobile staff member. In these embodiments, the system enables the user to make one or more inputs identifying the chip purchase voucher to be redeemed. In these embodiments, following receipt of the user inputted data associated with the attempted redemption of a chip purchase voucher, the gaming table component proceeds with operating with the gaming establishment chip management system to determine whether to authorize the redemption of the chip purchase voucher by verifying that the chip purchase voucher is a valid chip purchase voucher which is authentic and has not been previously returned, redeemed and/or voided by the gaming establishment chip management system.

In certain embodiments, if the gaming establishment chip management system determines not to authorize the redemption of the chip purchase voucher because the chip purchase voucher is inauthentic or otherwise invalid, such as being previously returned, redeemed or voided by the gaming establishment chip management system, the gaming establishment chip management system communicates a denial to the gaming table component (and/or the mobile device application, if applicable) and does not complete the chip purchase voucher redemption. In certain embodiments, following the denial, one or more display devices associated with the gaming table component (and/or the mobile device application) display a chip purchase voucher denial message the user and/or gaming establishment personnel.

On the other hand, if the gaming establishment chip management system determines to authorize the redemption of the chip purchase voucher because the chip purchase voucher is valid and authentic, the gaming establishment chip management system updates one or more databases regarding the redemption and associated deactivation of such a chip purchase voucher. That is, upon the successful redemption of a chip purchase voucher, the gaming establishment chip management system marks that chip purchase voucher as redeemed, thereby rendering that chip purchase voucher invalid from any future returns or redemptions.

In addition to updating one or more chip purchase voucher databases to reflect the successful redemption of the chip purchase voucher, the gaming establishment chip management system communicates an authorization of the redeemed chip purchase voucher to the gaming table component. Following receipt of such an authorization, the gaming table component causes a display device to display instructions to gaming establishment personnel to issue the user an amount of gaming chips corresponding to the gaming chips associated with the redeemed chip purchase voucher.

Figure 2C:
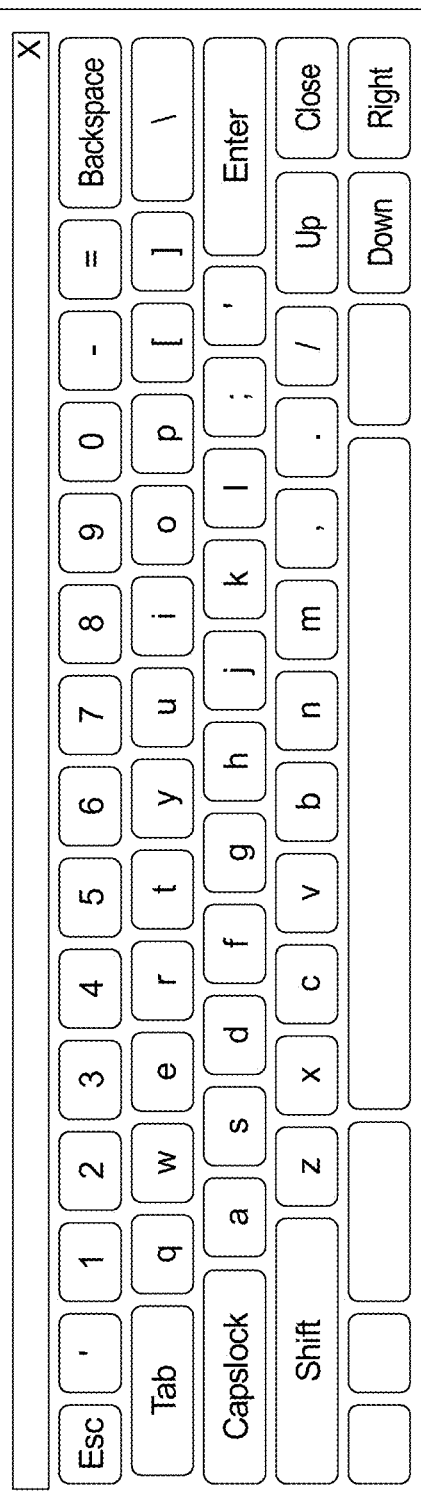
Figure 3:
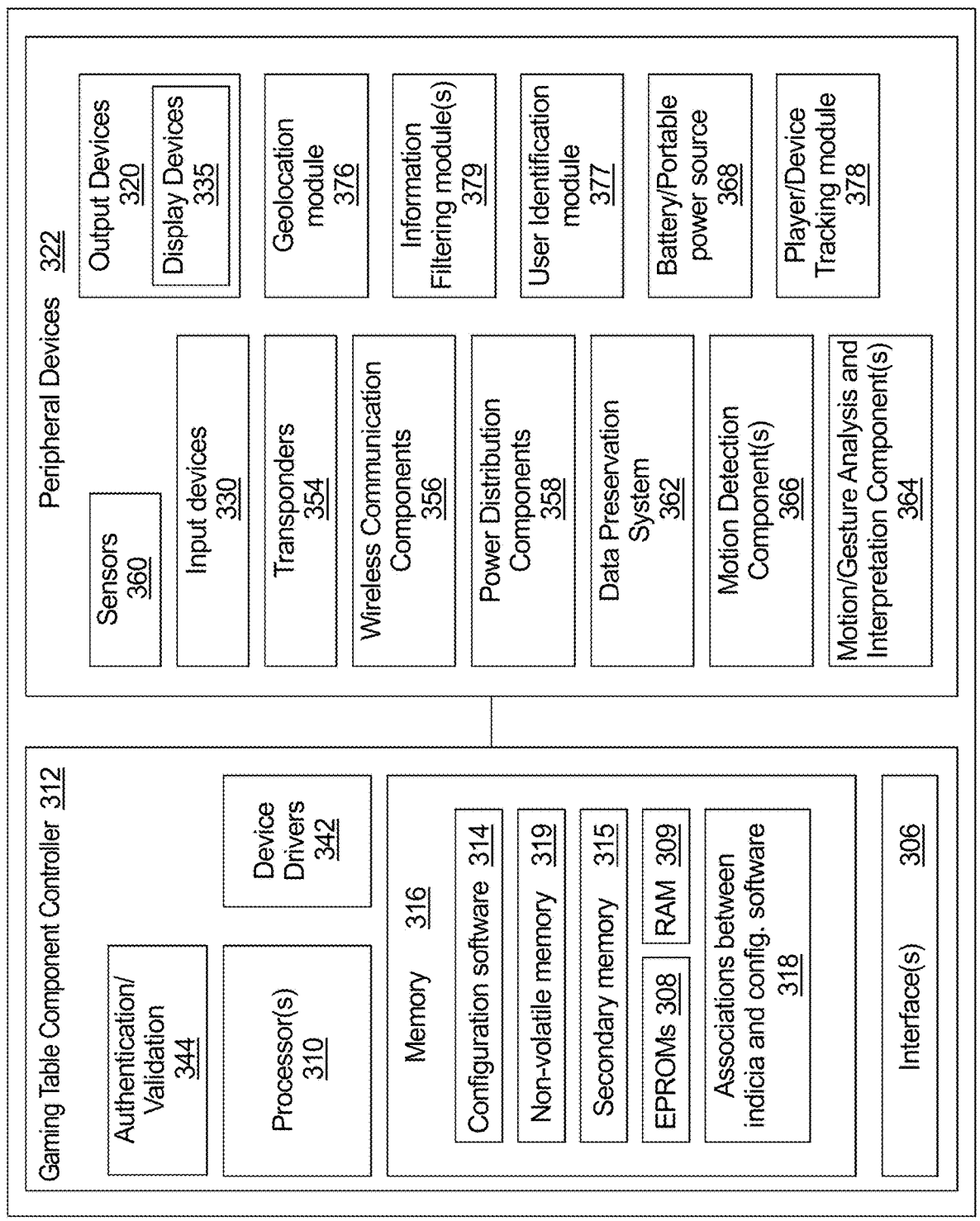
FIG. 3 is a schematic block diagram of one embodiment of a gaming table component of an example system of the present disclosure.

In one such embodiment, the gaming table component causes a display device of a dealer workstation to display instructions to a dealer to issue the user an amount of gaming chips corresponding to the gaming chips associated with the redeemed chip purchase voucher. For example, as seen in FIG. 2C, following the authorization of a redemption of a chip purchase voucher valued at $500, the gaming table component utilizes a dealer workstation 250 to inform the dealer to distribute $500 in cash chips to the user 252.

In one such embodiment, the gaming table component causes a display device of a mobile gaming table component, such as a mobile workstation associated with a gaming establishment mobile staff member, to display instructions to a gaming establishment staff member associated with the gaming table to issue the user an amount of gaming chips corresponding to the gaming chips associated with the redeemed chip purchase voucher.

Following the display of instructions to gaming establishment personnel to issue the user an amount of gaming chips corresponding to the gaming chips associated with the redeemed chip purchase voucher and following the gaming establishment personnel making one or more inputs indicating a completion of the issuance of the amount of gaming chips corresponding to the gaming chips associated with the redeemed chip purchase voucher, the gaming table component causes a receipt to be generated associated with the issuance of the gaming chips. In one such embodiment, the receipt is a physical receipt which the gaming establishment personnel deposited in a drop box or otherwise retains until submitted to the gaming establishment. In another such embodiment, the receipt is a virtual receipt which is communicated to one or more gaming establishment accounting servers.

It should be appreciated that in certain embodiments, since the issuance of chips from the redemption of a chip purchase voucher must be accounted for when reconciling the transactions associated with the gaming table, the gaming table component causes the generation of a receipt to memorialize the redemption. For example, if a dealer at a gaming table provides the user a quantity of gaming chips corresponding to the gaming chips associated with the redeemed chip purchase voucher, the dealer deposits the printed receipt into a dropbox at the gaming table such that at the end of the dealer's shift, the gaming chip tray is balanced when accounting for the cash which the dealer exchanged for gaming chips and the redeemed chip purchase vouchers. In another example, if a gaming establishment mobile staff member servicing an area with multiple gaming tables provides a user a quantity of gaming chips corresponding to the gaming chips associated with the redeemed chip purchase voucher, the mobile staff member deposits the printed receipt into a pouch or folder they carry with them such that at the end of the mobile staff member's shift, the gaming chips initially provided to the mobile staff member is balanced when accounting for the cash which the mobile staff member exchanged for gaming chips and the redeemed chip purchase vouchers.

In certain embodiments, in association with the issuance, return and/or redemption of a chip purchase voucher, certain jurisdictional regulations and/or gaming establishment policies require the user to approve the attempted transaction involving a chip purchase voucher. In one such embodiment, the user acknowledges the approval of the transaction involving a chip purchase voucher by entering a PIN via the mobile device application, providing a signature and/or presenting a biometric identifier to the mobile device. In another embodiment, the user acknowledges the approval of the transaction involving a chip purchase voucher by entering a PIN, providing a signature and/or presenting a biometric identifier to the gaming table component or a peripheral device associated with the gaming table component, such as a display device or input device associated with a component of the gaming establishment management system in communication with the gaming table component.

In certain such embodiments, in association the redemption of a chip purchase voucher at a gaming table, the system identifies a user at a gaming table (or in an area associated with a gaming table) by enabling the user to log into the gaming table via inserting or swiping their magnetic striped playing identification card at a card reader associated with the gaming table. In certain embodiments, the system identifies a user by enabling the user to log into a mobile gaming table component, such as a mobile workstation associated with a gaming establishment mobile staff member, via inserting or swiping their magnetic striped playing identification card at a mobile card reader associated with the mobile gaming table component. In certain other embodiments, the system identifies a user at a gaming table (or in an area associated with a gaming table) by enabling the user to log into the gaming table via entering a card number of their playing identification card at an input device, such as a keypad, associated with the gaming table. In certain embodiments, the system identifies a user by enabling the user to log into a mobile gaming table component, such as a mobile workstation associated with a gaming establishment mobile staff member, associated with a gaming establishment mobile staff member via entering a card number of their user identification card at an input device, such as a keypad, of the mobile gaming table component.

In certain other embodiments, the system identifies a user at a gaming table (or in an area associated with a gaming table) by enabling the user to log into an account, such as a player tracking account or the gaming establishment account maintained for the user utilizing a mobile device application. In certain such embodiments, following the launching of the mobile device application, such as following the user selecting an image associated with the account stored via a digital wallet application or following the mobile device application retrieving data associated with a user account stored via a digital wallet application, the mobile device application prompts the user to cause the mobile device to engage a gaming table component, such as prompting the user to tap the mobile device to a card reader or other designated location(s) of the gaming table component. After such engagement (or after the launching of the mobile device application if no mobile device to gaming table component engagement is required), the mobile device application communicates, via a wireless communication protocol, user account data stored by the mobile device to the gaming table component. The gaming table component proceeds with operating with one or more gaming establishment systems, such as a player tracking system, to log the user into the user account at that gaming table. Thereafter, any game play activity is associated with this identified user and the user account (just as if the user would have inserted a physical player tracking card into a player tracking card reader of the gaming table component). It should be appreciated that in these embodiments, since the user has already identified themselves to the gaming table component, the information displayed to the gaming establishment personnel includes identifying information regarding the user to issue the gaming chips to. In one such embodiment, the identifying information includes the user's name. In another such embodiment, the identifying information additionally or alternatively includes the seat at the gaming table where the user is located. In another such embodiment, the identifying information additionally or alternatively includes a picture of the user.

In certain embodiments, the system enables a user that has one or more printed chip purchase vouchers to convert the printed chip purchase voucher(s) to a virtual chip purchase voucher associated with a gaming establishment account maintained for the user. In these embodiments, following the user logging into the system (such that the system is aware of which gaming establishment account to store the virtual chip purchase voucher in association with), the user utilizes an interface, such as a mobile device application, a kiosk or an EGM, to provide identifying data associated with the paper chip purchase voucher. In one such embodiment, the user utilizes an image capture device associated with the interface, such as a camera of a mobile device, to scan a machine-readable code printed on the paper chip purchase voucher. In another such embodiment, the user utilizes a keypad associated with the interface to enter a chip purchase voucher identification number printed on the chip purchase voucher.

In these embodiments, following the identification of the paper chip purchase voucher, the system determines whether to authorize the conversion of the paper chip purchase voucher to a virtual chip purchase voucher. If the system determines not to authorize the conversion of the paper chip purchase voucher to a virtual chip purchase voucher, the system communicates a denial to the user and does not cause any virtual chip purchase vouchers to be issued. That is, upon the gaming establishment chip management system determining that the paper chip purchase voucher to be converted is no longer a valid chip purchase voucher, such as because the chip purchase voucher has already been converted to a virtual chip purchase voucher, the gaming establishment chip management system does not convert the paper chip purchase voucher to a virtual chip purchase voucher and rather causes a denial to be communicated to the user.

On the other hand, if the system determines to authorize the conversion of the paper chip purchase voucher to a virtual chip purchase voucher, the gaming establishment chip management system creates the requested virtual chip purchase voucher and communicates chip purchase voucher identification information to the gaming establishment fund management system (or a component of the gaming establishment fund management system, such as the chip purchase voucher system) to store in association with the gaming establishment account of the user. In addition to creating a virtual chip purchase voucher, the gaming establishment chip management system marks the paper chip purchase voucher as converted (or as redeemed or returned) to prevent the paper chip purchase voucher from being subsequently redeemed or returned.

In another embodiment, rather than storing the created virtual chip purchase voucher in association with a gaming establishment account associated with a user, the system stores the created virtual chip purchase voucher in association with a mobile device application. In this embodiment, the system enables a user that has a printed chip purchase voucher to convert the printed chip purchase voucher to an anonymous virtual chip purchase voucher associated with a mobile device, wherein the virtual chip purchase voucher may be redeemed or returned in association with the mobile device in accordance with the present disclosure.

It should be appreciated that various embodiments of the present disclosure support the movement of funds to and from a gaming table using a virtual chip purchase voucher provide for a relatively more efficient experience for users (e.g., a user does not need to first obtain cash or a paper chip purchase voucher to bring to a gaming table to be exchanged for gaming chips) and overcomes certain security concerns (e.g., users and/or gaming establishment personnel carrying large sums of cash) associated with both cash-based gaming and ticket voucher-based gaming. In addition to providing a relatively safer environment via the reduction of uses of cash, the system of the present disclosure reduces face-to-face interactions between users and gaming establishment personnel, thereby reducing risks associated with the spread of diseases between such parties. Moreover, such a configuration further reduces the use of paper chip purchase vouchers (which certain gaming table dealers may accept for gaming chips) and any ink associated with the production of such paper chip purchase vouchers to reduce the amount of waste produced by gaming establishments. Such a reduction in the amount of waste produced by gaming establishments provides an environmental benefit of implementing the system of the present disclosure.

In various embodiments, prior to transferring an amount of funds from a gaming establishment account in association with the issuance of a chip purchase voucher (and the transferring of an amount of funds to a gaming establishment account in association with a return of a chip purchase voucher), an amount of funds must first be established or otherwise deposited in the gaming establishment account.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the user establishes a gaming establishment fund management account by a deposit of funds (such as at a kiosk) to be subsequently utilized in association with the mobile device application. In other embodiments, the gaming establishment fund management account is funded via a mobile device electronic fund transfer, such using Apple Pay™ or Android Pay™. It should be appreciated that in different embodiments, the system utilizes a mobile device running a mobile device application, a kiosk, an electronic gaming machine, a gaming table component, a remote host controller service window displayed and/or a gaming establishment interface to facilitate the transfer of funds from a third-party account.

In certain embodiments, the system enables funds to be deposited in a gaming establishment fund management account via a gaming table component (or an EGM). In certain embodiments, the system enables a user that has an amount of cash to utilize an EGM (or an kiosk) to convert the cash to an amount deposited into a gaming establishment fund management account. In other embodiments, the system enables funds to be deposited in a gaming establishment fund management account via an EGM (or an kiosk) that accepts printed ticket vouchers. In these embodiments, the system enables a user that has one or more printed ticket vouchers to utilize an EGM (or an kiosk) to convert the printed ticket voucher to an amount deposited into a gaming establishment fund management account.

In certain embodiments, the system enables funds to be deposited in a gaming establishment fund management account via a gaming establishment interface, such as a casino desk. In certain embodiments, the system enables a user that has an amount of cash to utilize a gaming establishment interface, such as a casino desk to convert the cash to an amount deposited into a gaming establishment fund management account. In other embodiments, the system enables funds to be deposited in a gaming establishment fund management account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment fund management account.

In certain embodiments, the system enables funds to be deposited in a gaming establishment fund management account via a kiosk that accepts money. In certain embodiments, the system enables a user that has an amount of cash to utilize a kiosk to convert the cash to an amount deposited into a gaming establishment fund management account. In other embodiments, the system enables funds to be deposited in a gaming establishment fund management account via a kiosk that accepts printed ticket vouchers. In certain embodiments, the system enables a user that has one or more printed ticket vouchers to utilize a kiosk to convert the printed ticket voucher to an amount deposited into a gaming establishment fund management account.

In certain embodiments, the gaming establishment fund management account is associated with funds associated with one or more virtual ticket vouchers. In certain embodiments, the system enables a user associated with an amount of virtual ticket vouchers to utilize an gaming table component, a gaming table component, a mobile device running a mobile device application, a kiosk and/or a gaming establishment interface to convert the virtual ticket vouchers to an amount deposited into a gaming establishment fund management account.

In certain embodiments, the system enables a user to fund the gaming establishment fund management account independent of the mobile device and independent of the mobile device application. In certain other embodiments, the system enables a user to utilize a mobile device running a mobile device application to fund the gaming establishment fund management account. More specifically and utilizing the example of a kiosk, in one embodiment, to utilize a mobile device and a kiosk to facilitate the funding of a gaming establishment fund management account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with a gaming table component as described herein.

After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a physical ticket voucher (associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the user to transfer the deposited amount of funds (e.g., a "Load Phone Now" button) or continue to deposit additional amounts of funds with the kiosk. In another embodiment, for each amount of funds accepted by the kiosk, such as for each bill or unit of currency accepted by the kiosk, a virtual ticket voucher is created and deposited in the gaming establishment fund management account.

In certain embodiments, upon receiving an amount of funds from the user and the user indicating to transfer the deposited amount of funds in association with the mobile device application, the kiosk communicates with one or more servers to transfer an amount of money to a gaming establishment fund management account (to be drawn upon from the mobile device application as described herein). In another such embodiment, upon receiving an amount of funds from the user and the user indicating to transfer the deposited amount of funds in association with an account or balance associated with the mobile device application, the kiosk communicates with one or more servers, such as a virtual ticket voucher server, to create a virtual ticket voucher associated with the amount of received currency. The system of the present disclosure transfers the created virtual ticket voucher to the gaming establishment fund management account.

In various embodiments wherein a mobile device application is employed to facilitate a redemption of a chip purchase voucher at a gaming table and/or a chip purchase voucher is stored in association with a mobile device until being redeemed at a gaming table, prior to enabling a user to take any action related to the system, a pairing or linkage occurs between the mobile device and the gaming table component occurs via one or more wireless communication protocols. In such embodiments, the gaming table component of the present disclosure includes one or more mobile device interfaces for communicating with a mobile device utilizing one or more wireless communication protocols including, but not limited to: Bluetooth™, Bluetooth™ Low Energy ("BLE"), one or more cellular communication standards (e.g., 3G, 4G, 5G, LTE), one or more Wi-Fi compatible standards, and one or more short range communication protocols (e.g., a near field communication ("NFC") protocol). In certain embodiments, communication with the mobile device can occur through one or more wireless interfaces of the gaming table component. Such wireless interfaces are configured to receive information, such as information associated with one or more accounts and instructions to initiate a transfer of a chip purchase voucher from a gaming establishment account to the gaming table component (to be exchanged for an amount of gaming chips corresponding to the gaming chips associated with the redeemed chip purchase voucher) utilizing a mobile device. In one embodiment, the wireless interface is integrated into the cabinet of the gaming table component and the gaming table component processor is configured to communicate directly with and send control commands to the wireless interface. In another embodiment, the wireless interface is integrated into a device mounted to and/or within the gaming table component cabinet, such as a player tracking unit or a user identification device of a player tracking unit. In certain embodiments where the wireless interface is embedded in a secondary device, such as a player tracking unit, the gaming table component processor sends control commands to control the wireless interface via a secondary controller, such as a player tracking controller.

It should be appreciated that while certain data or information pertaining to one or more of the requested actions are communicated from a gaming table component (or a component of a gaming establishment management system supported by or otherwise located inside the gaming table component) to a mobile device, such data or information may additionally or alternatively be communicated: (i) from one or more servers to a mobile device via one or more wireless communication protocols, or (ii) from a gaming table component to one or more servers via one or more wireless communication protocols and then from one or more servers to a mobile device via one or more wireless communication protocols.

It should be further appreciated that any functionality or process described herein may be implemented via one or more servers, one or more gaming table components, one or more gaming establishment components (such as a component of a gaming establishment management system (e.g., a player tracking unit) supported by or otherwise located inside the gaming table component), or a mobile device application. For example, while certain data or information described herein is explained as being communicated from a gaming table component or a gaming establishment component (such as a component of a gaming establishment management system (e.g., a player tracking unit) supported by or otherwise located inside the gaming table component) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming table component, such functions, features or processes may alternatively be performed by one or more servers, or one or more mobile device applications, or one or more gaming establishment components (such as a component of a gaming establishment management system (e.g., a player tracking unit) supported by or otherwise located inside the gaming table component), (ii) while certain functions, features or processes are described herein as being performed by one or more mobile device applications, such functions, features or processes may alternatively be performed by one or more servers, or one or more gaming table components, or one or more gaming establishment components (such as a component of a gaming establishment management system (e.g., a player tracking unit) supported by or otherwise located inside the gaming table component), (iii) while certain functions, features or processes are described herein as being performed by one or more servers, such functions, features or processes may alternatively be performed by one or more gaming table components, or one or more mobile device applications, or one or more gaming establishment components (such as a component of a gaming establishment management system (e.g., a player tracking unit) supported by or otherwise located inside the gaming table component)), and (iv) while certain functions, features or processes are described herein as being performed by one or more gaming establishment components (such as a component of a gaming establishment management system (e.g., a player tracking unit) supported by or otherwise located inside the gaming table component), such functions, features or processes may alternatively be performed by one or more gaming table components, or one or more mobile device applications, or one or more servers. It should additionally be appreciated that any of the mobile device facilitated transactions involving a chip purchase voucher of the present disclosure may occur in addition to or as an alternative from cash-based transactions and/or ticket voucher-based transactions.

Gaming Table Components

Certain of the above-described embodiments of the present disclosure may be implemented in accordance with or in conjunction with one or more of a variety of different types of gaming table components, such as, but not limited to, a kiosk (or mobile gaming table component) and/or a kiosk (or mobile gaming table component) in combination with a server.

In certain embodiments, the gaming table component includes a gaming table component controller 312 configured to communicate with and to operate with a plurality of peripheral devices 322.

The gaming table component controller 312 includes at least one processor 310. The at least one processor 310 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information) via a communication interface 306 of the gaming table component controller 312; (2) converting signals read by an interface to a format corresponding to that used by software or memory of the gaming table component; (3) accessing memory to configure or reconfigure parameters in the memory according to indicia read from the gaming table component; (4) communicating with interfaces and the peripheral devices 322 (such as input/output devices); and/or (5) controlling the peripheral devices 322. In certain embodiments, one or more components of the gaming table component controller 312 (such as the at least one processor 310) reside within a housing of the gaming table component (described below), while in other embodiments at least one component of the gaming table component controller 312 resides outside of the housing of the gaming table component.

The gaming table component controller 312 also includes at least one memory device 316, which includes: (1) volatile memory (e.g., RAM 309, which can include non-volatile RAM, magnetic RAM, ferroelectric RAM, and any other suitable forms); (2) non-volatile memory 319 (e.g., disk memory, FLASH memory, EPROMs, EEPROMs, memristor-based non-volatile solid-state memory, etc.); (3) unalterable memory (e.g., EPROMs 308); (4) read-only memory; and/or (5) a secondary memory storage device 315, such as a non-volatile memory device, configured to store gaming software related information (the software related information and the memory may be used to store various audio files not currently being used and invoked in a configuration or reconfiguration). Any other suitable magnetic, optical, and/or semiconductor memory may operate in conjunction with the gaming table component of the present disclosure. In certain embodiments, the at least one memory device 316 resides within the housing of the gaming table component (described below), while in other embodiments at least one component of the at least one memory device 316 resides outside of the housing of the gaming table component.

The at least one memory device 316 is configured to store, for example: (1) configuration software 314, such as all the parameters and settings on the gaming table component; (2) associations 318 between configuration indicia read from a gaming table component with one or more parameters and settings; (3) communication protocols configured to enable the at least one processor 310 to communicate with the peripheral devices 322; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the gaming table component to communicate with local and non-local devices using such protocols. In one implementation, the gaming table component controller 312 communicates with other devices using a serial communication protocol. A few non-limiting examples of serial communication protocols that other devices, such as peripherals (e.g., a bill validator or a ticket printer), may use to communicate with the gaming table component controller 312 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 316 is configured to store program code and instructions executable by the at least one processor of the gaming table component to control the gaming table component. The at least one memory device 316 of the gaming table component also stores other operating data, such as image data, event data, input data, or information, and/or applicable rules on the gaming table component. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a gaming table component to implement at least part of the present disclosure. In other embodiments, part or all of the program code and/or the operating data is downloaded to the at least one memory device of the gaming table component through any suitable data network described above (such as an Internet or intranet).

The at least one memory device 316 also stores a plurality of device drivers 342. Examples of different types of device drivers include device drivers for gaming table component components and device drivers for the peripheral components 322. Typically, the device drivers 342 utilize various communication protocols that enable communication with a particular physical device. The device driver abstracts the hardware implementation of that device. For example, a device driver may be written for each type of card reader that could potentially be connected to the gaming table component. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the gaming table component loads the new device driver from the at least one memory device to enable communication with the new device. For instance, one type of card reader in the gaming table component can be replaced with a second different type of card reader when device drivers for both card readers are stored in the at least one memory device.

In certain embodiments, the software units stored in the at least one memory device 316 can be upgraded as needed. For instance, when the at least one memory device 316 is a hard drive, new parameters, new settings for existing parameters, new settings for new parameters, new device drivers, and new communication protocols can be uploaded to the at least one memory device 316 from the gaming table component controller 312 or from some other external device. As another example, when the at least one memory device 316 includes a CD/DVD drive including a CD/DVD configured to store options, parameters, and settings, the software stored in the at least one memory device 316 can be upgraded by replacing a first CD/DVD with a second CD/DVD. In yet another example, when the at least one memory device 316 uses flash memory 319 or EPROM 308 units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device 316 also stores authentication and/or validation components 344 configured to authenticate/validate specified gaming table component components and/or information, such as hardware components, software components, firmware components, peripheral device components, user input device components, information received from one or more user input devices, information stored in the at least one memory device 316, etc.

In certain embodiments, the peripheral devices 322 include several device interfaces, such as: (1) at least one output device 320 including at least one display device 335; (2) at least one input device 330 (which may include contact and/or non-contact interfaces); (3) at least one transponder 354; (4) at least one wireless communication component 356; (5) at least one wired/wireless power distribution component 358; (6) at least one sensor 360; (7) at least one data preservation component 362; (8) at least one motion/gesture analysis and interpretation component 364; (9) at least one motion detection component 366; (10) at least one portable power source 368; (11) at least one geolocation module 376; (12) at least one user identification module 377; (13) at least one user/device tracking module 378; and (14) at least one information filtering module 379.

The at least one output device 320 includes at least one display device 335 configured to display any displayed by the gaming table component and any suitable information. In certain embodiments, the display devices are connected to or mounted on a housing of the gaming table component (described below).

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In certain embodiments, the at least one output device 320 is a sound generating device controlled by one or more sound cards. In one such embodiment, the sound generating device includes one or more speakers or other sound generating hardware and/or software configured to generate sounds.

The at least one input device 330 may include any suitable device that enables an input signal to be produced and received by the at least one processor 310 of the gaming table component.

In various embodiments, the at least one input device 330 includes a plurality of buttons that are programmable by the gaming table component operator to, when actuated, cause the gaming table component to perform particular functions. In certain embodiments, the at least one input device 330 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the gaming table component by touching the touch screen at the appropriate locations.

In embodiments including a player tracking system, as further described below, the at least one input device 330 includes a card reader in communication with the at least one processor of the gaming table component.

The at least one wireless communication component 356 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 356 transmits electrical, electromagnetic, or optical signals that carry digital data streams or analog signals representing various types of information.

The at least one wired/wireless power distribution component 358 includes components or devices that are configured to provide power to other devices. For example, in one embodiment, the at least one power distribution component 358 includes a magnetic induction system that is configured to provide wireless power to one or more user input devices near the gaming table component. In one embodiment, a user input device docking region is provided, and includes a power distribution component that is configured to recharge a user input device without requiring metal-to-metal contact. In one embodiment, the at least one power distribution component 358 is configured to distribute power to one or more internal components of the gaming table component, such as one or more rechargeable power sources (e.g., rechargeable batteries) located at the gaming table component.

In certain embodiments, the at least one sensor 360 includes at least one of: optical sensors, pressure sensors, RF sensors, infrared sensors, image sensors, thermal sensors, and biometric sensors. The at least one sensor 360 may be used for a variety of functions, such as: detecting movements and/or gestures of various objects within a predetermined proximity to the gaming table component; detecting the presence and/or identity of various persons (e.g., users, casino employees, etc.), devices (e.g., user input devices), and/or systems within a predetermined proximity to the gaming table component.

The at least one data preservation component 362 is configured to detect or sense one or more events and/or conditions that, for example, may result in damage to the gaming table component and/or that may result in loss of information associated with the gaming table component. Additionally, the data preservation system 362 may be operable to initiate one or more appropriate action(s) in response to the detection of such events/conditions.

The at least one motion/gesture analysis and interpretation component 364 is configured to analyze and/or interpret information relating to detected user movements and/or gestures to determine appropriate user input information relating to the detected user movements and/or gestures. For example, in one embodiment, the at least one motion/gesture analysis and interpretation component 364 is configured to perform one or more of the following functions: analyze the detected gross motion or gestures of a user; interpret the user's motion or gestures to identify instructions or input from the user. In other embodiments, at least a portion of these additional functions may be implemented at a remote system or device.

The at least one portable power source 368 enables the gaming table component to operate in a mobile environment. For example, in one embodiment, the gaming table component 300 includes one or more rechargeable batteries.

The at least one geolocation module 376 is configured to acquire geolocation information from one or more remote sources and use the acquired geolocation information to determine information relating to a relative and/or absolute position of the gaming table component. For example, in one implementation, the at least one geolocation module 376 is configured to receive GPS signal information for use in determining the position or location of the gaming table component. In another implementation, the at least one geolocation module 376 is configured to receive multiple wireless signals from multiple remote devices (e.g., gaming table components, servers, wireless access points, etc.) and use the signal information to compute position/location information relating to the position or location of the gaming table component.

The at least one user identification module 377 is configured to determine the identity of the current user or current owner of the gaming table component. For example, in one embodiment, the current user is required to perform a login process at the gaming table component in order to access one or more features. Alternatively, the gaming table component is configured to automatically determine the identity of the current user based on one or more external signals, such as an RFID tag or badge worn by the current user and that provides a wireless signal to the gaming table component that is used to determine the identity of the current user. In at least one embodiment, various security features are incorporated into the gaming table component to prevent unauthorized users from accessing confidential or sensitive information.

The at least one information filtering module 379 is configured to perform filtering (e.g., based on specified criteria) of selected information to be displayed at one or more displays 335 of the gaming table component.

In various embodiments, the gaming table component includes a plurality of communication ports configured to enable the at least one processor of the gaming table component to communicate with and to operate with external peripherals, such as: accelerometers, arcade sticks, bar code readers, bill validators, biometric input devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

Gaming Tables

In certain embodiments, as indicated above, the system employs one or more intelligent gaming tables or gaming chip tracking systems. In one embodiment, each intelligent gaming table enables one or more users to play one or more suitable games by placing one or more wagers utilizing such gaming chips. Such game play and/or wagering information is tracked by the intelligent gaming table and provided to a server. In another embodiment, the server is in communication with at least one player tracking system to identify at least one user currently placing at least one wager on at least one suitable game at at least one of the intelligent gaming tables in the system.

In another embodiment, the gaming tables utilized in the system are non-intelligent gaming tables wherein the gaming chip identification devices are not directly integrated or situated in or on the gaming tables. In this embodiment, one or more gaming chip identification devices are utilized to track each user's wagered gaming chips. In one such embodiment, gaming chip identification devices are located at, above or below the table. In another such embodiment, the gaming chip identification devices are attached to the gaming table or adjacent to the gaming table. In another such embodiment, the gaming chip identification devices are included in the gaming table. In these embodiments, gaming establishments do not have to purchase new gaming tables. Rather, gaming establishments may continue using the same gaming tables and install the intelligent table technology around one or more gaming tables.

Figure 4:
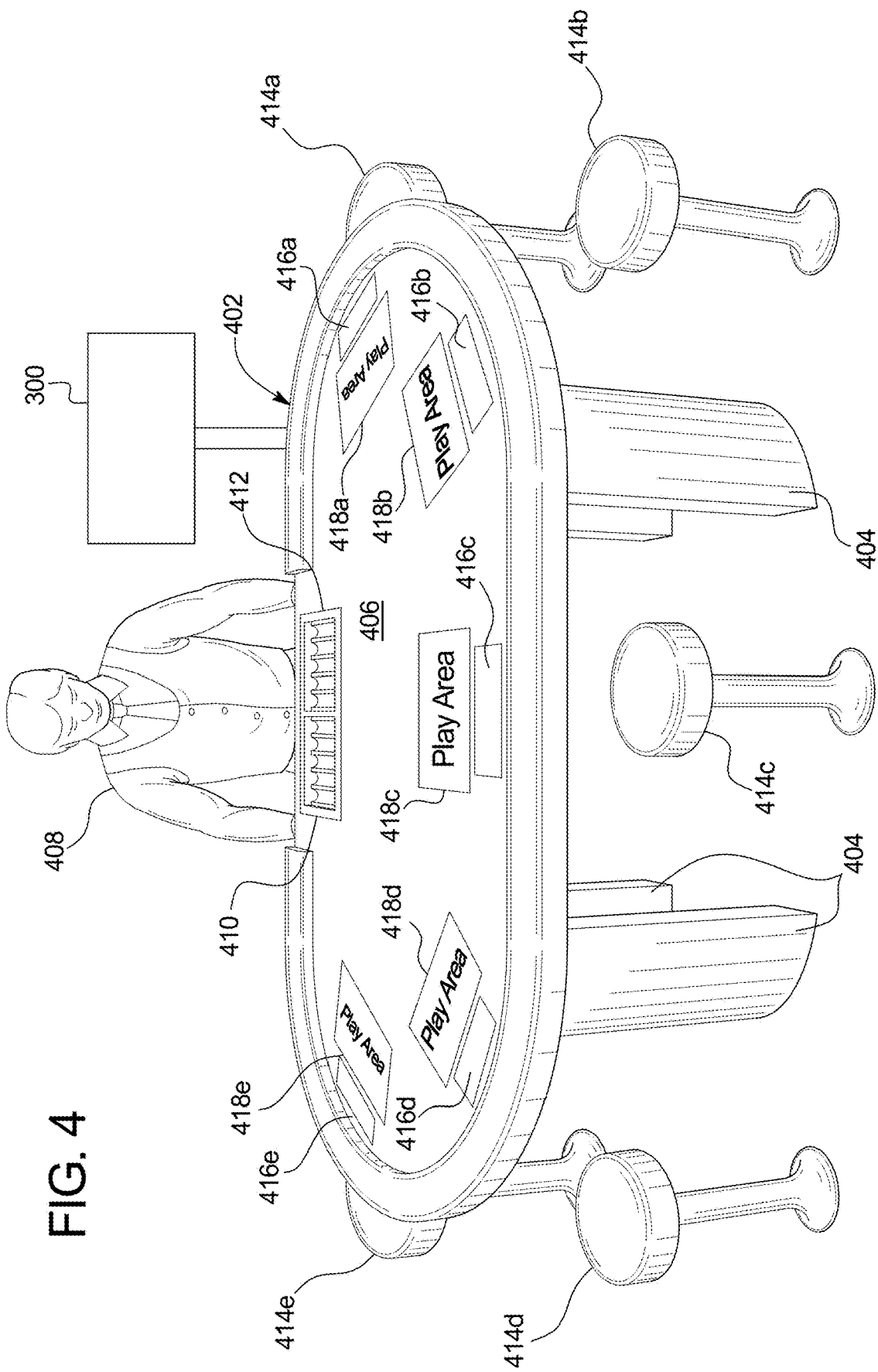
FIG. 4 is a perspective view of one embodiment of a gaming table of the present disclosure.

In one embodiment, as illustrated in FIG. 4, a gaming table 402 includes a suitable support structure 404, such as one or more legs, a playing surface 406 and a dealer position 408. In one embodiment, the dealer position includes two different gaming chip trays 410 and 412 for holding several stacks of the dealer's gaming chips. The dealer may use the gaming chip trays to collect and store gaming chips, make change for a user, and/or distribute gaming chips upon a gaming chip distribution event associated with the gaming table component 300. The gaming table includes a plurality of user stations or seats 414a, 414b, 414c, 414d and 414e. In this example, there are five user stations or seats. It should be appreciated that the gaming table may accommodate any suitable number of user positions and users so as not to interfere with game play. In one embodiment, the gaming table includes a plurality of gaming chip holding areas 416a, 416b, 416c, 416d and 416e where the users hold their gaming chips. In certain embodiment, the gaming tables include wagering areas (not illustrated) where users place their bets. It should be appreciated that the gaming table may also include a community wagering area (not illustrated) where each of the users place their wagers. In one embodiment, the gaming table also includes a plurality of playing areas 418a, 418b, 418c, 418d and 418e associated with each of the user stations.

In one embodiment, cards are dealt by the dealer substantially within the respective playing areas, such that cards dealt to a first user position are not confused with cards dealt to a second different user position. It should be appreciated that games played at the gaming tables may include any suitable card game or any suitable non-card game, such as roulette and craps. The gaming tables are operable to include any suitable apparatuses or components of the games. It should be appreciated that different gaming tables in the system may include the same game components or different game components.

In one embodiment, one or more gaming tables in the system each include at least one processor and at least one memory device, including, but not limited to the processors and memory devices of the gaming table component described above. In one embodiment, the system of gaming tables is integrated with one or more player tracking systems. In this embodiment, the system and/or player tracking system is operable to track any participating user's gaming activity at each gaming table of the system. In one such embodiment, the system and/or the associated player tracking system timely tracks when a user inserts their playing tracking card to begin a gaming session and also timely tracks when a user removes their player tracking card, stops playing at the gaming table or cashes out when concluding play for that gaming session. In another embodiment, the dealer or host logs the user in and out. In one such embodiment, at the start of a gaming session, the user hands the user's tracking card to the dealer and the dealer or host logs the user in and out for a gaming session. In different embodiments, the system works in accordance with the player tracking system to maintain data about users.

In other embodiments, rather than requiring a user to insert a player tracking card or enter identifying information, the gaming table utilizes one or more portable devices carried by a user, such as a mobile device, a radio frequency identification tag or any other suitable wireless device to track when a user begins and ends a gaming session. In other embodiments, the gaming table utilizes any suitable biometric technology or ticket technology to track when a user begins and ends a gaming session. Each of the gaming tables may include any suitable number of player tracking input devices, such as card readers or key pads to enter identification numbers. In one embodiment, each user station or seat includes an individual player tracking input device. In another embodiment, a gaming table includes a single player tracking input device. In another embodiment, only a dealer has access to the player tracking input device and inputs all of each user's information.

It should be appreciated that the intelligent table system of the present disclosure may include any suitable components or devices to monitor the users' gaming activity. That is, the intelligent table systems tracks how much a user wagers or how many gaming chips a user wagers, how much a user has won or lost, how many gaming chips the user has on the gaming table, or any other desired tracking information. In one embodiment, the intelligent table system also tracks this information for each and every game played by the user. It should be appreciated that the intelligent table system may include any suitable gaming table areas with gaming chip identification devices, any suitable method of identifying the gaming chips, and may use any suitable gaming chip reading technology.

In one embodiment, the intelligent gaming tables or gaming chip tracking systems tracks, monitors and records game play occurring at one or more gaming table user stations, regardless of which user is currently playing at each gaming station. In another embodiment, the intelligent gaming tables or gaming chip tracking systems tracks, monitors and records game play of one or more users at such gaming tables. In this embodiment, the player tracking system identifies users and records or saves the game play information provided by the intelligent tables in specific user accounts.

In another embodiment, the intelligent gaming table of the present disclosure employs a virtual gaming table. The virtual gaming table provide virtual playing cards and/or virtual gaming chips which enable one or more users to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with wireless networks to display and detect objects and movement. In this embodiment, as users move their hands or objects on the table top, the cameras translate the motions into commands.

It should be appreciated that values may be assigned to gaming chips in any suitable manner. In one embodiment, different denominations of gaming chips are visually different, such as having the value displayed on the gaming chip, having different sizes and/or having different weights. In another such embodiment, each gaming chip is associated with one of a plurality of different values. In this embodiment, the intelligent table system identifies the individual gaming chips (such as using RFID technology described herein), determines the placement of each gaming chip and sends the information to the player tracking system or server about each of the specific gaming chips. In one embodiment, the server associates the value of the gaming chip with the player tracking account.

In one embodiment, each of the gaming chips has or is associated with an identification number. The intelligent table system determines the gaming chip identification number upon play or win of a gaming chip or upon the evaluation of all of the gaming chips in a user's gaming chip identification area. The intelligent table system sends the gaming chip information to the server. The system associates the gaming chip number with the amount and the user. For example, a first user's gaming chip identification area includes gaming chip number 876543 which is associated with the value of $1, gaming chip number 876545 which is associated with the value of $5 and gaming chip number 876547 which is associated with the value of $10. In one embodiment, the intelligent table system determines which gaming chips are in which identification area and sends the information to the server. The system associates the gaming chip numbers with their value and uses the information to determine one or more aspects of game play.

The intelligent table system of the present disclosure is operable to use a variety of types of technology to track user activity. More specifically, in one embodiment, the intelligent table system is operable to include one or more gaming chip identifying devices. In one embodiment, the intelligent table system uses Infra-red signals received from table game gaming chips to track activity. In another embodiment, as indicated above, the intelligent table system employs RFID to track gaming chip activity. The RFID is a system that uses a small electronic device that includes a small gaming chip and an antenna. The gaming chips are scanned at the gaming table to retrieve the identifying information. In another embodiment, the system uses optical technology. The system may use any suitable other gaming chip identification devices, which may use any suitable gaming chip identification technology, to determine user gaming table wagering activities. The gaming chips are tracked for total gaming chip movement or wins and losses. When each gaming chip is placed in a gaming chip identification area, such as a betting circle or in a user's betting or wagering area, gaming chip identification devices recognizes the gaming chip and relays this data to the intelligent table system.

The system of the present disclosure contemplates a plurality of different methods that the gaming chips may be used and/or identified during game play. In one embodiment, a gaming chip identification area is a gaming chip holding area. In one embodiment, intelligent table system identifies all of the gaming chips in a user's gaming chip holding area. For example, during game play, a user is required to have all gaming chips in that user's possession in a gaming chip holding area which each include one or more gaming chip identification devices. Upon a game play checkpoint, such as at a designated time interval, upon a triggering event, at the end of a play of a game or at the end of a gaming session, the intelligent table system surveys each of the user's gaming chip holding areas to identify the users' gaming chips.

In one embodiment, the gaming chip identification area is a wagering area. In one embodiment, the system includes gaming chip identification devices in each user's wagering area. The system identifies either the specific gaming chips wagered and won or loss by that user or the number of gaming chips wagered and won or loss by the user. For example, a user logs into the player tracking system via a card slot at the user's user station at a gaming table. When a user places a gaming chip in the wagering area associated with that user station, the intelligent table system identifies that gaming chip. When a dealer or host provides a gaming chip to a user for a win, the intelligent table system identifies the gaming chip.

In another embodiment, both the gaming chip holding area and the wagering area include gaming chip identification devices. That is, the system is operable to identify gaming chips in both the gaming chip holding area and the wagering area. Therefore, the system double checks or verifies each user's gaming activity.

In one embodiment, the system associates the gaming activity directly with users via user accounts. For example, at the start of play, the user logs into the player tracking system, such as by inserting a player tracking card into a card reader associated with their user station on the gaming table. In this embodiment, the intelligent table system associates any tracked data with the user's specific account. Thus, in certain embodiments, tracking user activity at the gaming table is similar in accuracy and thoroughness to the tracking done at slot machines.

Alternatively, the system determines the gaming chip count at each user station. That is, the system enables users to play anonymously and be associated with their current place at the table. For example, a user does not have to log in for one or more plays of a game but rather remains at a same user station for such plays of the game. The system associates the gaming chips with the user stations.

In certain embodiments, the intelligent table system includes one or more card readers or a card reading system. The card reading system knows what card comes out of the shoe and is dealt to what user. In one embodiment, the card reading system is a part of the intelligent table system. In another embodiment, the card reading system is separate from the intelligent table system and in association with the intelligent table system detects betting patterns and decisions to provide to the player tracking system. Such betting patterns and decisions may qualify the user to win one or more bonus awards. The card reading system can also reduce dealer error and or possible corruption by making sure that the users are paid properly for each and every hand. In certain embodiments, the intelligent table system knows the user cards, the dealer cards, and the bet, the intelligent table system is enabled to determine correct payouts for each and every user at the gaming table. In certain embodiments, the system employs safeguards to make sure the correct payout is made. For example, the system can send a halt play signal if an error is detected. It should be appreciated that in different embodiments the card reading system and the intelligent table system are integrated with or included in one or more tracking systems or player tracking systems.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A device comprising:
a first communication interface connectable to serially communicate, in accordance with a serial communication protocol, data to a server of a gaming establishment cashless wagering system;
a second communication interface connectable to communicate data to a controller of a workstation associated with a physical gaming table;
a processor; and
a memory device that stores a plurality of instructions that, when executed by the processor, cause the processor to:
responsive to an approval of a virtual chip purchase voucher request associated with an amount of funds transferred from a cashless wagering account associated with an identified user to a gaming establishment chip management system account not associated with any users:
cause data associated with an issued virtual chip purchase voucher to be stored in association with a virtual chip purchase voucher account associated with an identified user, wherein the issued virtual chip purchase voucher is distinct from any printed cashless ticket voucher redeemable at any electronic gaming machine, the issued virtual chip purchase voucher is distinct from any virtual cashless ticket voucher redeemable at any electronic gaming machine, the approval of the virtual chip purchase voucher request occurs independent of any transaction involving any exchange of any physical item associated with any monetary value, the transfer from the cashless wagering account occurs independent of any transaction involving any exchange of any physical item associated with any monetary value, and the transfer from the cashless wagering account occurs based on a communication, via the first communication interface and in accordance with the serial communication protocol, of data to the server of the gaming establishment cashless wagering system, and
cause the issued virtual chip purchase voucher to be available based on a wireless communication of the data associated with the issued virtual chip purchase voucher to a mobile device of the identified user and without causing any printer to print any chip purchase vouchers physically redeemable at any physical gaming tables, wherein the issued virtual chip purchase voucher is not redeemable at any electronic gaming machine, and responsive to a receipt of data associated with an attempted redemption of the issued virtual chip purchase voucher and responsive to a determination to authorize the attempted redemption of the issued virtual chip purchase voucher, communicate, via the second communication interface, data that results in a display device of the workstation associated with the physical gaming table displaying an amount of physical gaming chips, wherein the determination is based on the issued virtual chip purchase voucher not being any of a previously returned issued virtual chip purchase voucher, a previously redeemed issued virtual chip purchase voucher and a previously voided issued virtual chip purchase voucher, and a distribution of the amount of physical gaming chips occurs independent of any transaction involving any exchange of any physical item associated with any monetary value.

2. The device of claim 1, wherein the gaming establishment cashless wagering account and the virtual chip purchase voucher account comprise a single account.

3. The device of claim 1, wherein the determination to authorize the attempted redemption of the issued virtual chip purchase voucher occurs following another identification of the user at a user identification device associated with the physical gaming table.

4. The device of claim 3, wherein the attempted redemption of the issued virtual chip purchase voucher occurs in association with the mobile device of the identified user.

5. The device of claim 1, wherein the approval of the virtual chip purchase voucher request is based on if the cashless wagering account has at least the amount of funds.

6. The device of claim 1, wherein the data associated with the issued virtual chip purchase voucher comprises a virtual chip purchase voucher redemption code.

7. The device of claim 1, wherein the issued virtual chip purchase voucher is associated with one of: a configuration of the amount of physical gaming chips, and a chipset of the amount of physical gaming chips.

8. The device of claim 1, wherein the memory device stores a plurality of further instructions that, when executed by the processor responsive to the approval of the virtual chip purchase voucher request, cause the processor to:
determine a loyalty award based on the amount of funds associated with the issued virtual chip purchase voucher, and
cause the determined loyalty award to be stored in association with the identified user.

9. A method of operating a device, the method comprising:
responsive to an approval of a virtual chip purchase voucher request associated with an amount of funds transferred from a cashless wagering account associated with an identified user to a gaming establishment chip management system account not associated with any users:
causing, by a processor, data associated with an issued virtual chip purchase voucher to be stored in association with a virtual chip purchase voucher account associated with an identified user, wherein the issued virtual chip purchase voucher is distinct from any printed cashless ticket voucher redeemable at any electronic gaming machine, the issued virtual chip purchase voucher is distinct from any virtual cashless ticket voucher redeemable at any electronic gaming machine, the approval of the virtual chip purchase voucher request occurs independent of any transaction involving any exchange of any physical item associated with any monetary value, the transfer from the cashless wagering account occurs independent of any transaction involving any exchange of any physical item associated with any monetary value, and the transfer from the cashless wagering account occurs based on a serial communication, via a first communication interface and in accordance with a serial communication protocol, of data to a server of a gaming establishment cashless wagering system, and
causing, by the processor, the issued virtual chip purchase voucher to be available based on a wireless communication of the data associated with the issued virtual chip purchase voucher to a mobile device of the identified user and without causing any printer to print any chip purchase vouchers physically redeemable at any physical gaming tables, wherein the issued virtual chip purchase voucher is not redeemable at any electronic gaming machine, and responsive to a receipt of data associated with an attempted redemption of the issued virtual chip purchase voucher and responsive to a determination to authorize the attempted redemption of the issued virtual chip purchase voucher, communicating, via a second communication interface, data to a controller of a workstation associated with a physical gaming table that results in a display device of the workstation displaying an amount of physical gaming chips, wherein the determination is based on the issued virtual chip purchase voucher not being any of a previously returned issued virtual chip purchase voucher, a previously redeemed issued virtual chip purchase voucher and a previously voided issued virtual chip purchase voucher, and a distribution of the amount of physical gaming chips occurs independent of any transaction involving any exchange of any physical item associated with any monetary value.

10. The method of claim 9, wherein the gaming establishment cashless wagering account and the virtual chip purchase voucher account comprise a single account.

11. The method of claim 9, wherein the determination to authorize the attempted redemption of the issued virtual chip purchase voucher occurs following another identification of the user at a user identification device associated with the physical gaming table.

12. The method of claim 11, wherein the attempted redemption of the issued virtual chip purchase voucher occurs in association with the mobile device of the identified user.

13. The method of claim 9, wherein the approval of the virtual chip purchase voucher request is based on if the cashless wagering account has at least the amount of funds.

14. The method of claim 9, wherein the data associated with the issued virtual chip purchase voucher comprises a virtual chip purchase voucher redemption code.

15. The method of claim 9, wherein the issued virtual chip purchase voucher is associated with one of: a configuration of the amount of physical gaming chips, and a chipset of the amount of physical gaming chips.

16. The method of claim 9, further comprising, responsive to the approval of the virtual chip purchase voucher request:
determining, by the processor, a loyalty award based on the amount of funds associated with the issued virtual chip purchase voucher, and causing, by the processor, the determined loyalty award to be stored in association with the identified user.

\* \* \* \* \*